(12) United States Patent
Li et al.

(10) Patent No.: US 10,297,396 B2
(45) Date of Patent: May 21, 2019

(54) GRAPHENE-BASED FILMS

(71) Applicant: Monash University, Clayton VIC (AU)

(72) Inventors: Dan Li, Glen Waverley (AU); Xiaowei Yang, Clayton (AU)

(73) Assignee: Monash University, Clayton (AU)

( * ) Notice: Subject to any disclaimer, the term of this patent is extended or adjusted under 35 U.S.C. 154(b) by 20 days.

(21) Appl. No.: 14/773,527

(22) PCT Filed: Mar. 3, 2014

(86) PCT No.: PCT/AU2014/000197
§ 371 (c)(1),
(2) Date: Sep. 8, 2015

(87) PCT Pub. No.: WO2014/134663
PCT Pub. Date: Sep. 12, 2014

(65) Prior Publication Data
US 2016/0016804 A1 Jan. 21, 2016

(30) Foreign Application Priority Data

Mar. 8, 2013 (AU) ............................... 2013900820

(51) Int. Cl.
*H01B 1/04* (2006.01)
*B82Y 30/00* (2011.01)
(Continued)

(52) U.S. Cl.
CPC ............... *H01G 11/32* (2013.01); *B82Y 40/00* (2013.01); *C01B 32/182* (2017.08);
(Continued)

(58) Field of Classification Search
CPC . H01B 1/04; H01B 1/24; B82Y 30/00; B82Y 40/00
(Continued)

(56) References Cited

U.S. PATENT DOCUMENTS 8,072,733 B2 12/2011 Hatori et al.
8,137,650 B2 3/2012 Gogotsi et al.
(Continued)

FOREIGN PATENT DOCUMENTS

CN 102874796 * 1/2013 ............ C01B 31/04
WO 2007/020959 2/2007
(Continued)

OTHER PUBLICATIONS

Simon "Capacitive Energy Storage in Nanostructured CarbonElectrolyte Systems." Accounts of Chemical Research ' 1094-1103 ' 2013 ' vol. 46, No. 5 (Year: 2013).*

(Continued)

*Primary Examiner* — Tri V Nguyen
(74) *Attorney, Agent, or Firm* — Banner & Witcoff, Ltd.

(57) ABSTRACT

This present invention relates to a method of preparing graphene-based film, said method comprising: providing a first graphene-based film comprising sheets of graphene, graphene oxide, partially reduced graphene oxide, reduced graphene oxide, or a combination of two or more thereof, that are (i) arranged relative to each other in a substantially planar manner so as to form a layered structure, and (ii) at least partially separated by a liquid medium; exchanging said liquid medium with a packing density adjustment medium that comprises at least two components, wherein one of said components has a volatility greater than the other component; and removing at least some of the more volatile component from the first graphene-based film to produce a graphene-based film that has a different packing density of the graphene-based sheets relative to that of the first graphene-based film.

6 Claims, 12 Drawing Sheets

(51) Int. Cl.
| | |
|---|---|
| H01G 11/32 | (2013.01) |
| B82Y 40/00 | (2011.01) |
| H01G 11/36 | (2013.01) |
| C01B 32/22 | (2017.01) |
| C01B 32/225 | (2017.01) |
| C01B 32/23 | (2017.01) |
| C01B 32/182 | (2017.01) |
| C01B 32/194 | (2017.01) |

(52) U.S. Cl.
CPC ............ *C01B 32/194* (2017.08); *C01B 32/22* (2017.08); *C01B 32/225* (2017.08); *C01B 32/23* (2017.08); *H01G 11/36* (2013.01); *C01B 2204/22* (2013.01); *Y02E 60/13* (2013.01)

(58) Field of Classification Search
USPC .............................. 252/500, 511, 502, 510
See application file for complete search history.

(56) References Cited

U.S. PATENT DOCUMENTS

| | | | | |
|---|---|---|---|---|
| 2011/0287241 | A1* | 11/2011 | Korkut | B82Y 30/00 428/219 |
| 2015/0287543 | A1* | 10/2015 | Aksay | B82Y 30/00 361/502 |

FOREIGN PATENT DOCUMENTS

| | | |
|---|---|---|
| WO | 2008/143829 A2 | 11/2008 |
| WO | 2012/006657 A1 | 1/2012 |

OTHER PUBLICATIONS

Chmiola et al, Monolithic Carbide-Derived Carbon Films for Micro-Supercapacitors, Science vol. 328(5977), pp. 480-483, dated 2010.
Chimola, et al, Anomalous Increase in Carbon Capacitance at Pore Sizes Less Than 1 Nanometer, Science, vol. 313(5794), pp. 1760-1763, dated 2006.
El-Kady, et al., Laser Scribing of High Performance and Flexible Graphene-Based Electrochemical Capacitors, Science, vol. 335(6074), pp. 1326-1330, dated 2012.
Futaba, et al., Shape-engineerable and highly densely packed single-walled carbon nanotubes and their application as super-capacitor electrodes, Nat Mater, vol. 5(12), pp. 987-994, dated 2006.
Izadi-Najafabadi, et al., Extracting the Full Potential of Single-Walled Carbon Naotubes as Durable Supercapacitor Electrodes Operable at 4 V with High Power and Energy Density, Advanced Materials, vol. 22(35), pp. E235-E241, dated 2010.
Zhang, et al., Highly Conductive and Porous Activated Reduced Graphene Oxide Films for High-Power Supercapacitors, Nano Letters, vol. 12(4), pp. 1806-1812, dated 2012.
Zhu, et al., Carbon-Based Supercapacitors Produced by Activation of Graphene, Science, vol. 332(24), pp. 1537-1541, dated 2011.
Feb. 2, 2017—(EP) Extended Search Report—App 14760115.7.
Choi, Bong Gill et al, "High performance of a solid-state flexible asymmetric supercapacitor based on graphene films", Nanoscale, 2012, 4, pp. 4983-4988.
Zheng, Jian et al , "High quality graphene with large flakes exfoliated by olel amine", Chemical Communications, 2010, 46, pp. 5728-5730.
Matsuo, Yoshiaki et al, "Pillared carbons consisting of silsesquioxane bridged graphene layers for hydrogen storage materials", International Journal of Hydrogen Energy, 37, May 5, 2012, pp. 10702-10708.
Cheng, Chi et al, "Multilayered graphene membrane as an experimental platform to probe nano-confined electrosorption", Chinese Materials Research Society, Dec. 21, 2012, pp. 668-672.
Liu, Wenwen et al., "Effects of concentration and temperature of EMIMBF4/acetonitrile electrolyte on the supercapacitive behavior of graphene nanosheets", Journals of Materials Chemistry, 2012, 22, pp. 8853-8861.
Yang, Xiaowei et al., "Ordered Gelation of Chemically Converted Graphene for Next-Generation Electroconductive Hydrogel Films", Angewandte Chemie International Edition, 50, 2011, pp. 7325-7328.
Qiu, Ling et al., "Controllable corrugation of chemically converted graphene sheets in water and potential application for nanofiltration", Chemical Communications, 2011, 47, pp. 5810-5812.
Zhu Junwu et al., "Dyanmic Electrosorption Analyssi as an Effective Means to Characterise the Structure of Bulk Graphene Assemblies", Chemistry—A European Journal, 2013, 19, pp. 3082-3089.
Sun, Ling et al, "Massive production of graphene oxide from expanded graphite", Retrieved on Sep. 23, 2016 from https://arxiv.org/ftp/arxiv/papers/1301/1301.3253.pdf.
Yang, X., et al., "Bioinspired Effective Prevention of Restacking in Multilayered Graphene Films: Towards the Next Generation of High-Performing Supercapacitors" Adv. Mater., 2011, vol. 23, pp. 2833-2838.
Yang, X., et al., "Ordered Gelation of Chemically Converted Graphene for Next-Generation Electroconductive Hydrogel Films" Agnew. Chem. Int. Ed., 2011, vol. 50, pp. 7325-7328.
Paek, E, et al., "A Computational Study of the Interfacial Structure and Capacitance of Graphene in [BMIM][PF6] Ionic Liquid" Journal of the Electrochemical Society, 2013, vol. 160 No. 1, pp. A1-A10.
'Carbon', Wikipedia, [retrieved on May 12, 2014]. Retrieved from the Internet: <http://en.wikipedia.org/w/index.php?title=Carbon &oldid=541997946> published on Mar. 8, 2013 per Wikipedia history record.
International Search Report and Written Opinion dated May 13, 2014 (PCT/AU2014/000197); ISA/AU.
Wang, Xiluan, et al., "Solution-processable Graphene Nanomeshes with Controlled Pore Structures" Scientific Reports 3, 2013, article 1996.

\* cited by examiner

GRAPHENE-BASED FILMS

CROSS-REFERENCE TO RELATED APPLICATIONS

This application is a national stage application of co-pending PCT application PCT/AU2014/000197 filed Mar. 3, 2014 which claims priority to Australian application 2013900820 filed Mar. 8, 2013. The disclosures of these application are expressly incorporated herein by reference in their entirety.

FIELD OF THE INVENTION

The present invention relates in general to graphene-based materials. More particularly it relates to a method of preparing graphene-based film, to graphene-based film and to articles or devices comprising the same. Graphene-based film in accordance with the invention is particularly suitable for use in energy storage systems such as supercapacitors, and it will therefore be convenient to describe the invention with an emphasis toward this application. However, it is to be understood that the graphene-based films can be employed in numerous other applications.

BACKGROUND OF THE INVENTION

Graphene is a two-dimensional (2D) sheet structure of $sp^2$-bonded carbon atoms with unique electronic, chemical and mechanical properties. The significance of these unique properties are now just being realised, with graphene-based sheets being applied in various applications such as energy storage, catalysis, sensing, filtration and composites.

A considerable amount of research has been directed toward forming various graphene-based structures. One particular field of research showing great promise is the development of graphene-based film structures.

A number of techniques have been developed for producing graphene-based films. For example, graphene-based films have been prepared by filtration of graphene-based suspensions. Filtration has been widely used for manufacturing film-like structures such as writing paper since ancient times, but it has only recently been applied in the fabrication of graphene-film materials.

So called "graphene paper films" are typically formed on a membrane filter by vacuum filtration of partially reduced or reduced graphene dispersions. The resulting dry graphene paper is self-supporting with a degree of flexibility and can be peeled off from the membrane filter for subsequent use. Its structure is made up of closely packed laminated graphene-based sheets and can exhibit a conductivity of about 7,200 S/m at room temperature.

Despite such dry graphene-based paper films having good utility in certain applications, the relatively close packing of the graphene-based sheets results in a small inter-sheet separation distance (similar to that of graphite) having a packing density of about 1.49 $g/cm^3$, which in turn presents a number of limitations including limited energy storage properties and a relatively low specific surface area.

Recently, WO 2012/006657 reported on new graphene-based gel film structures having graphene-based sheets arranged in a substantially planar manner relative to each other and being at least partially separated by a liquid medium such as water. The graphene-based gel films described are said to exhibit enhanced properties, relative to their dry paper counterparts, such as improved mechanical strength and electrical conductivity.

The gel films are also said to have a more open pore structure with a highly accessible surface area of individual graphene-based sheets.

Notably, the liquid medium retained in the gel films is believed to function as an inter-sheet spacing element thereby preventing the graphene-based sheets from becoming undesirably too closely packed.

Despite advances provided by these graphene-based gel films, the properties exhibited by them are by in large believed to be reliant upon their packing density, and this is inherently fixed depending upon the nature of the graphene-based material and liquid medium employed. In other words, the properties of a given graphene-based gel film are substantially fixed and predetermined by the graphene material and liquid medium used. Accordingly, to date there has been limited opportunity to adjust the properties of a given graphene-based gel film.

The liquid medium present within a graphene-based gel film can of course be removed, for example through evaporation. However, it has been found that the liquid medium tends to be removed unevenly across the film resulting in undesirable deformation of the film structure. For example, edge deformation of the film can occur due to preferential and non-uniform removal (relative to the remainder of the film) of the liquid medium from the film. Removing liquid medium from gel films to adjust the film properties has therefore to date not been particularly effective.

Accordingly, there remains an opportunity to develop a method for preparing graphene-based films that enables improved control over the resulting film structure and properties. By providing such control there also remains an opportunity for providing unique graphene-based films having improved properties.

SUMMARY OF THE INVENTION

The present invention therefore provides a method of preparing graphene-based film, said method comprising:
providing a first graphene-based film comprising sheets of graphene, graphene oxide, partially reduced graphene oxide, reduced graphene oxide, or a combination of two or more thereof, that are (i) arranged relative to each other in a substantially planar manner so as to form a layered structure, and (ii) at least partially separated by a liquid medium;
exchanging said liquid medium with a packing density adjustment medium that comprises at least two components, wherein one of said components has a volatility greater than the other component; and
removing at least some of the more volatile component from the first graphene-based film to produce a graphene-based film that has a different packing density of the graphene-based sheets relative to that of the first graphene-based film.

For convenience only, the so formed graphene-based film that has a different packing density of the graphene-based sheets relative to that of the first graphene-based film may be referred to herein as a (the) second graphene-based film.

It has now been found that graphene-based films can be prepared with an ability to vary and gain excellent control over the packing density of the graphene-based sheets. Such variation in the packing density correspondingly imparts control over other important film properties such as inter-sheet separation distance between the substantially planar graphene-based sheets and the ion accessible surface area of the film. The resulting graphene-based films can advantageously be provided with a desired packing density of the graphene-based sheets while still presenting a substantially uniform structure across the film, which in turn provides for graphene-based film materials exhibiting coherent properties. Notably, such coherent properties can be obtained for a given graphene-based film in conjunction with the ability to tailor the graphene-based sheet packing density.

The ability to control the packing density of the graphene-based sheets has unexpectedly resulted in an ability to produce graphene-based films with unprecedented properties, for example those exhibiting a volumetric energy density approaching that of lead-acid batteries.

The present invention can advantageously provide for porous yet densely packed graphene-based films that can exhibit high ion-accessible surface area and low ion transport impedance.

Accordingly, the present invention also provides graphene-based film comprising sheets of graphene, graphene oxide, partially reduced graphene oxide, reduced graphene oxide, or a combination of two or more thereof, that are (i) arranged relative to each other in a substantially planar manner so as to form a layered structure, and (ii) separated by a liquid medium, wherein the film exhibits a packing density ($\rho$) of the graphene-based sheets ranging from 0.1-1.40 g/cm$^3$.

In one embodiment, the packing density ($\rho$) of the graphene-based sheets ranges from about 0.2 to about 1.40 g/cm$^3$, or about 0.3 to about 1.40 g/cm$^3$, or about 0.4 to about 1.40 g/cm$^3$, or from about 0.5 to about 1.40 g/cm$^3$, or from about 0.6 to about 1.40 g/cm$^3$, or from about 0.7 to 1.40 g/cm$^3$, or from about 0.8 to 1.40 g/cm$^3$, or from about 0.9 to 1.40 g/cm$^3$, or from about 1.0 to 1.40 g/cm$^3$.

In another embodiment, the packing density ($\rho$) of the graphene-based sheets ranges from about 0.1 to about 1.35 g/cm$^3$, or about 0.2 to about 1.35 g/cm$^3$, or about 0.3 to about 1.35 g/cm$^3$, or from about 0.4 to about 1.35 g/cm$^3$, or from about 0.5 to about 1.35 g/cm$^3$, or from about 0.6 to about 1.35 g/cm$^3$, or from about 0.7 to about 1.35 g/cm$^3$, or from about 0.8 to about 1.35 g/cm$^3$, or from about 0.9 to about 1.35 g/cm$^3$, or from about 1.0 to about 1.35 g/cm$^3$.

In a further embodiment, a graphene-based film in accordance with the invention exhibits a specific volumetric capacitance ($C_{vol}$) ranging from about 100 F/cm$^3$ to about 300 F/cm$^3$, or from about 150 F/cm$^3$ to about 270 F/cm$^3$, at an operation rate of 0.1 A/g and using 1.0 M H$_2$SO$_4$ as electrolyte.

In another embodiment, a graphene-based film in accordance with the invention exhibits a $C_{vol}$ of at least 100 F/cm$^3$, or at least 150 F/cm$^3$, or at least 180 F/cm$^3$, or at least 200 F/cm$^3$, or at least 210 F/cm$^3$, or at least 220 F/cm$^3$, or at least 230 F/cm$^3$, or at least 240 F/cm$^3$, or at least 250 F/cm$^3$, or at least 260 F/cm$^3$ at an operation rate of 0.1 A/g and using 1.0 M H$_2$SO$_4$ as electrolyte.

In a further embodiment, a graphene-based film in accordance with the invention exhibits a $C_{vol}$ ranging from about 50 F/cm$^3$ to about 180 F/cm$^3$, or from about 75 F/cm$^3$ to about 175 F/cm$^3$, or from about 85 F/cm$^3$ to about 175 F/cm$^3$, at an operation rate of 50 A/g and using 1.0 M H$_2$SO$_4$ as electrolyte.

In another embodiment, a graphene-based film in accordance with the invention exhibits a $C_{vol}$ of at least 50 F/cm$^3$, or at least 75 F/cm$^3$, or at least 85 F/cm$^3$, or at least 100 F/cm$^3$, or at least 125 F/cm$^3$, or at least 135 F/cm$^3$, or at least 145 F/cm$^3$, or at least 150 F/cm$^3$, at an operation rate of 50 A/g and using 1.0 M H$_2$SO$_4$ as electrolyte.

In a further embodiment, a graphene-based film in accordance with the invention exhibits a specific gravimetric capacitance ($C_{wt-c}$) ranging from about 100 F/g to about 225 F/g, or from about 150 F/g to about 200 F/g, at an operation rate of 0.1 A/g and using 1.0 M H$_2$SO$_4$ as electrolyte.

In another embodiment, a graphene-based film in accordance with the invention exhibits a $C_{wt-c}$ of at least 100 F/g, or at least 150 F/g, or at least 160 F/g, or at least 170 F/g, or at least 180 F/g, or at least 190 F/g, or at least 195 F/g, or at least 200 F/g, or at least 205 F/g, or at least 210 F/g at an operation rate of 0.1 A/g and using 1.0 M H$_2$SO$_4$ as electrolyte.

In a further embodiment, a graphene-based film in accordance with the invention exhibits a $C_{wt-c}$ ranging from about 50 F/g to about 180 F/g, or from about 75 F/g to about 175 F/g, at an operation rate of 50 A/g and using 1.0 M H$_2$SO$_4$ as electrolyte.

In a another embodiment, a graphene-based film in accordance with the invention exhibits a $C_{wt-c}$ of at least 50 F/g, or at least 75 F/g, or at least 85 F/g, or at least 100 F/g, or at least 125 F/g, or at least 135 F/g, or at least 145 F/g, or at least 150 F/g, at an operation rate of 50 A/g and using 1.0 M H$_2$SO$_4$ as electrolyte.

In a further embodiment, a graphene-based film comprising 1.0 mg/cm$^2$ of graphene-based material in accordance with the invention exhibits a relaxation time ($\tau_0$) of less than 1.06, or 1.0, or 0.90, or 0.80, or 0.70, or 0.60, or 0.50, or 0.40, or 0.30, or 0.20, or 0.18, or 0.16, or 0.14, or 0.12 seconds, where $\tau_0$ is the minimum time needed to discharge all energy from the capacitor cell with an efficiency of at least 50%.

In another embodiment, a graphene-based film comprising 1.0 mg/cm$^2$ of graphene-based material in accordance with the invention exhibits a $\tau_0$ ranging from about 1.06 to about 0.12 seconds, or from about 0.5 to about 0.12 seconds.

In yet a further embodiment, the liquid medium in a graphene-based film according to the invention represents 50 vol % or less of the film material relative to the vol % occupied by the graphene-based sheets. In another embodiment, the liquid medium represents about 10 vol % to about 50 vol % of the film material relative to the vol % occupied by the graphene-based sheets.

Without wishing to be limited by theory, it is believed that graphene-based films according to the invention can be prepared with excellent control over the graphene-based sheet packing density at least in part by employing the packing density adjustment medium.

Conventional graphene-based paper films are typically produced with a packing density of about 1.49 g/cm$^3$. This relatively high density has been found to limit the application of such films at least in part due poor ion transport through, and a low ion accessible surface area of, the film structure.

On the other hand, graphene-based gel films of the type disclosed in WO 2012/006657 present a relatively low graphene-based sheet packing density of about 0.06 g/cm$^3$. This packing density is substantially fixed for a given gel film. Attempts to remove liquid medium from such gel films to promote an increase in the packing density typically results in films having non-uniform properties and structural defects.

The packing density adjustment medium used in accordance with invention comprises at least two components, one of which has a greater volatility than the other, and this medium is exchanged with the liquid medium in a previously formed first graphene-based film. The resulting modified first graphene-based film now has graphene-based sheets that are partially separated by the packing density adjustment medium. Removing at least some of the more volatile component from the modified first graphene-based film can result in an increase in the graphene-based sheet packing density relative to that of the original unmodified graphene-based film.

Adjusting the ratio of the more volatile component relative to the less volatile component present in a given volume of the exchanged packing density adjustment medium advantageously enables the graphene-based sheet packing density to be varied and controlled as desired through removal of the more volatile component. For example, under appropriate conditions the more volatile component can be removed from the modified graphene-based film thereby leaving the resulting film with a predetermined amount of the less volatile component between the graphene-based sheets, which in turn influences the graphene-based sheet packing density.

Without wishing to be limited by theory, it is believed that the presence of the less volatile component at the time when the more volatile component is being removed imparts a stabilising wetting effect on the graphene-based sheets that enables their graphene-based sheet packing density to be varied with little or no undesirable structural deformation or development of non-uniform properties across the film.

Furthermore, through an ability to carefully control the graphene-based sheet packing density of a given graphene-based film it has been found that the resulting film can be provided with packing densities that give rise to unique and advantageous properties.

Without wishing to be limited by theory, it is also believed that use of the packing density adjustment medium not only results in a larger inter-sheet separation distance and correspondingly reduced packing density (relative to a dry graphene paper film), but it may also play a role in facilitating ion transport. In particular, because less area of graphene-based sheets are in physical contact with each other due to prominent repulsive solvation forces provided by liquid medium in the sub-nanometer region between sheets, a much shortened ion transport path inside the resulting films forms compared to that of a dry graphene paper film.

The present invention also provides a device comprising graphene-based film (a) according to the invention, or (b) prepared by the method of the invention. In one embodiment, such a device is selected from a biomedical device, an electrode, a battery, a separation device, a sensor, a supercapacitor and an actuator.

The present invention further provides a supercapacitor comprising at least one graphene-based film (a) according to the invention, or (b) prepared by the method of the invention, as an electrode.

Further aspects and/or embodiments of the invention are discussed in more detail below.

BRIEF DESCRIPTION OF THE DRAWINGS

The invention will herein be described with reference to the following non-limiting drawings in which.

Figure 1:
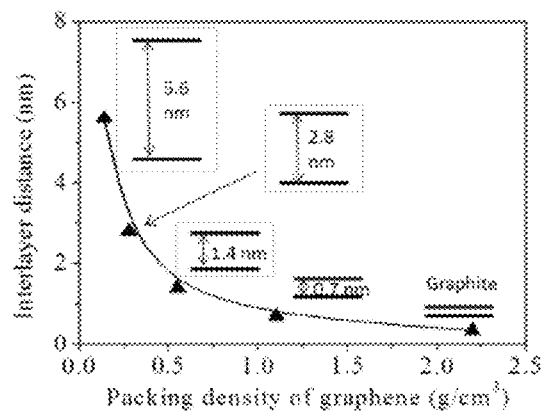
FIG. 1 illustrates a theoretical calculation of an oriented graphene assembly. There is a correlation between packing density and interlayer distance of the assembly: Packing density*interlayer distance=Constant.

Some Figures contain colour representations or entities. Coloured versions of the Figures are available upon request.

DETAILED DESCRIPTION OF THE INVENTION

The present invention relates in general to graphene-based films. The graphene-based films comprise sheets of graphene, graphene oxide, partially reduced graphene oxide, reduced graphene oxide or combinations thereof (i.e. combinations of two or more of graphene, graphene oxide, partially reduced graphene oxide and reduced graphene oxide).

Graphene is an allotrope of carbon having a one atom thick planar sheet structure of typically sp$^2$-bonded carbon atoms that are densely packed in a honeycomb 2D crystal lattice. The covalently bonded carbon atoms typically form repeating units that comprise 6-membered rings, but can also form 5-membered rings and/or 7-membered rings. A layer of such covalently bonded carbon atoms is commonly referred to as a graphene "sheet". Graphene may be prepared by exfoliation of graphite, which has a structure made up from closely packed layered graphene sheets.

Graphene oxide is oxygenated graphene that is prepared by exfoliation of graphite oxide. Graphene oxide is considered to have a graphene-like molecular structure that is substituted with oxygenated groups such as hydroxyl and epoxide. Graphite oxide may be prepared using a number of techniques such as the so called Brodie, Staudenmaier, or Hummers methods.

While the atomic composition of graphene oxide can vary slightly depending upon the method by which it has been prepared, it will typically exhibit (when prepared in the form a dispersion in water) an absorption peak maxima, as measured by UV-VIS spectroscopy, within the range of about 223 to about 233 nm.

Despite having a different atomic composition to graphene, graphene oxide nevertheless has a sheet structure similar to graphene. Unlike graphene, graphene oxide can be readily dispersed in an aqueous liquid such as water.

Partially reduced or reduced graphene oxide is a material prepared by reducing graphene oxide. Techniques for reducing graphene oxide are known in the art. For example, graphene oxide can be partially reduced or reduced by chemical reduction.

Partially reduced or reduced graphene oxide used in accordance with the invention will typically exhibit (when prepared in the form a dispersion in water) an absorption peak maxima, as measured by UV-VIS spectroscopy, of at least 235 nm, or at least about 240 nm, or at least about 250 nm, or at least about 260 nm, or at least about 270 nm, or at least about 275 nm.

Partially reduced or reduced graphene oxide used in accordance with the invention will therefore typically exhibit (when prepared in the form of a dispersion in water) an absorption peak maxima, as measured by UV-VIS spectroscopy, ranging from about 235 nm to about 275 nm.

Despite having a different atomic composition to graphene, partially reduced and reduced graphene oxide nevertheless have a sheet structure similar to graphene.

In the context of the present invention, the expression "graphene-based" film is intended to mean that the film has a structure comprising sheets of graphene, graphene oxide, partially reduced graphene oxide, reduced graphene oxide, or a combination of two or more thereof. The expression "graphene-based" may therefore be used herein as a convenient reference to graphene (sheets), graphene oxide (sheets) partially reduced graphene oxide (sheets), reduced graphene oxide (sheets), or a combination thereof.

The first graphene-based film used according to the method of the invention might therefore be described as having a graphene-based structure or matrix that consists essentially of, or is made up from, sheets of graphene, graphene oxide, partially reduced graphene oxide, reduced graphene oxide, or a combination of two or more thereof.

Similarly, the graphene-based film in accordance with the invention might therefore also be described as having a graphene-based structure or matrix consisting essentially of, or being made from, sheets of graphene, graphene oxide, partially reduced graphene oxide, reduced graphene oxide, or a combination of two or more thereof.

The graphene-based sheets used in accordance with the invention may comprise holes or pores in the sheet structure. Such graphene-based sheets are commonly referred to as "holey" graphene-based sheets or graphene-based (nano) meshes. Techniques for producing porous graphene-based sheets are known in the art, see for example Scientific Reports 3, Article No. 1996, doi:10.1038/srep01996; Wang et. al.

In one embodiment, the graphene-based structure of the film does not comprise graphene oxide.

For avoidance of any doubt, reference to a "graphene-based structure" or "graphene-based matrix" is intended to mean a structure or matrix per se that is made from graphene-based sheets. Accordingly, where the graphene-based structure or matrix consists essentially of, or is made from, sheets of graphene, graphene oxide, partially reduced graphene oxide, reduced graphene oxide, or a combination of two or more thereof, the overall structure or matrix may hold within its confines other materials such the liquid medium.

Reference herein to a graphene-based "film" is intended to mean a three dimensional collection of graphene-based sheets arranged relative to each other in a substantially planar manner so as to form a layered structure or matrix having thickness, length and width dimensions. The thickness of the layered structure will typically be considerably smaller than both of its length and width dimensions so as to provide for conventional film-like dimension characteristics.

Where the graphene-based sheets used to form the film have a porous (holey) structure, the resulting film can itself exhibit porous (holey) properties.

There is no particular limitation on the thickness of the graphene-based film, and this dimension will typically be dictated by the intended application for the film.

In one embodiment the graphene-based film may have a thickness of about 20 µm, or at least about 40 µm, or at least about 50 µm, or at least about 60 µm, or at least about 80 µm, or at least about 100 µm. In a further embodiment, the graphene-based film has a thickness ranging from about 20 µm to about 100 µm.

Where the graphene-based films are relatively thin it may be convenient to prepare them on a suitable support that is used in conjunction with the graphene-based film in a desired application, for example, in a device.

Graphene-based films in accordance with the invention may also have a thickness of less than about 20 µm, or less than about 10 µm, or less than about 5 µm, or less than about 1 µm, or less than about 800 nm, or less than about 500 nm, or less than about 250 nm, or less than about 100 nm, or less than about 50 nm, or less than about 10 nm. In one embodiment, the graphene-based film has a thickness ranging from about 10 nm to about 20 µm.

The thickness of the graphene-based film is the average thickness of the film as defined by a collective of graphene-based sheets arranged relative to each other in a substantially planar manner so as to form a layered structure.

According to the method of the invention, the graphene-based film is prepared by providing a first graphene-based film. This first graphene-based film comprises sheets of graphene, partially reduced graphene oxide, reduced graphene oxide, or combinations thereof, that are (i) arranged relative to each other in a substantially planar manner so as to form a layered structure, and (ii) at least partially separated by a liquid medium. Such a graphene-based film may be conveniently prepared as outlined in WO 2012/006657. In that case, the first graphene-based film may also be referred to as a gel film.

The liquid medium present in the first graphene-based film may be an organic or aqueous liquid medium. Where the liquid medium is an organic liquid, the first graphene-based film may also be referred to as an organogel film. Examples of suitable organic liquid mediums include ethanol, methanol, toluene, ethylene glycol, dimethyl formamide (DMF) and tetrahydrofuran (THF). Where the liquid medium of the first graphene-based film is an aqueous liquid medium such as water, the graphene-based film may be referred to as a hydrogel film.

The first graphene-based film used in accordance with the invention may be prepared, as outlined in WO 2012/006657, by contacting a surface with liquid medium comprising sheets of graphene, graphene oxide, partially reduced graphene oxide, reduced graphene oxide, or combinations thereof, and removing some of the liquid medium from the surface so as to allow the graphene-based sheets to self-assemble in a substantially planar manner on the surface and thereby form the film.

The liquid medium comprising the graphene-based sheets will generally be provided in the form of a dispersion. The concentration of the graphene-based sheets in the so formed liquid medium dispersion will generally be a range of from about 0.1 mg/ml to about 1 mg/ml, or from about 0.2 mg/ml to about 0.8 mg/ml or from about 0.4 mg/ml to about 0.6 mg/ml. The volume of the liquid medium dispersion used will of course determine the ultimate thickness of the so formed first graphene-based film.

During formation of the first graphene-based film, the liquid medium dispersion comprising the graphene-based sheets may be subjected to an increase in temperature. For example, the liquid medium dispersion may be heated to a temperature above room temperature. Increasing the temperature of the liquid medium dispersion may be, and typically is, performed before the graphene-based film is formed.

The temperature of the liquid medium dispersion may be increased by any suitable means.

In one embodiment, the temperature of the liquid medium dispersion is increased to at least about 90° C., or at least about 95° C., or at least about 100° C., or at least about 12° C., or at least about 130° C., or at least about 140° C., or at least about 150° C., or at least about 180° C. The temperature to which the liquid medium dispersion is heated will of course depend on the nature of the liquid medium used.

The liquid medium dispersion may be held at the selected temperature for a suitable period of time, for example about 30 minutes, about 1 hour, about 2 hours, about 3 hours, about 5 hours, or about 8 hours.

Following the step of increasing the liquid medium dispersion temperature, the dispersion can be allowed to cool. The resulting liquid medium dispersion can then be applied to the surface on which the first graphene-based film forms by any suitable means, including being poured, pumped or drawn under vacuum.

When preparing the first graphene-based film, there is no particular limitation on the type of the surface that is contacted with the liquid medium comprising the graphene-based sheets. For example, the surface may form part of a substrate made from metal, glass, ceramic, composite material, paper, polymer, or combination thereof. The surface may be flat, curved, undulating or may have a defined shape that is intended to be imparted upon the resulting graphene-based film. In that way, the surface can act effectively as a mould to impart features of shape and configuration upon the film.

Although the resulting film may assume a shaped or moulded gross configuration, the graphene-based sheets within the film will nonetheless retain a substantially planar relationship with respect to each other.

In one embodiment, the surface upon which the first graphene-based film is formed is porous and can function as a filter to allow for passage therethrough, and removal of, liquid medium during the film formation process.

The first graphene-based film has graphene-based sheets that are arranged relative to each other in a substantially planar manner so as to form a layered structure. The layered structure of the film will typically include overlapping (but not necessarily touching) graphene-based sheets. The layered structure will also typically be electrically conductive. In that case, the graphene-based sheets will be positioned sufficiently close to enable electron communication between adjacent sheets.

By having a "layered" structure it will be appreciated that the graphene-based sheets are presented in a stacked formation. In that regard, the graphene-based sheets are stacked relative to each other in a substantially planar manner. Reference to the graphene-based sheets being "substantially planar" is not intended to convey that the sheets per se are flat. Indeed, as noted below, it is likely in many cases that at a molecular level the sheets present with a corrugated or undulating configuration. Accordingly, reference to the graphene-based sheets being "substantially planar" is intended to mean that the vast majority of the sheets within the film are generally located within the same average plane or within substantially parallel planes. For example, at least about 60% or at least about 70%, or at least about 80% or at least about 90%, or at least about 95%, or at least about 98%, or at least about 99%, or at least about 99.9% of the graphene-based sheets within the film will be aligned along their major axis at less than about 45°, or less than about 35°, or less than about 15°, or no more than about 10°, or no more than about 7°, or no more than about 5°, or no more than about 3°, or no more than about 1°, relative to adjacent sheets.

The graphene-based sheets in the first graphene-based film are also at least partially separated by a liquid medium. Provided that the first graphene-based film can be suitably prepared, there is no particular limitation concerning the nature of the liquid medium used. For example, suitable liquid mediums include those described herein such as an aqueous liquid (e.g. water), ethanol, methanol, toluene, ethylene glycol, DMF and THF.

The liquid medium may comprise one or more additives that can be used to impart desirable properties to a resulting graphene-based film. Examples of suitable additives are outlined in WO 2012/006657. In one embodiment the liquid medium comprises a polymer, for example a polymer that is soluble in an aqueous medium (e.g. polyvinyl alcohol (PVA)).

Until recently, it was a common perception that relatively close face-to-face orientated graphene-based sheets would inherently collapse and restack to form a graphite-like material due to inter-sheet $\pi$-$\pi$ attractions. However, graphene-based films in accordance with the invention contain graphene-based sheets that remain at least partially separated by the liquid medium. Without wishing to be limited by theory, it is believed that the presence of the liquid medium in combination with a corrugated or undulating configuration of the sheets, and possibly their high stiffness, prevents collapse and stacking of the sheets such that they remain at least partially separated.

Accordingly, reference herein to graphene-based sheets being "at least partially separated by a liquid medium" is intended to mean that the graphene-based sheets have liquid medium located within the inter-sheet separation distance and removal of that liquid will result in a reduction of that inter-sheet separation distance together with an increase in the graphene-based sheet packing density.

As used herein, "inter-sheet separation distance" is intended to mean the average distance between stacked planar graphene-based sheets. Those skilled in the art will appreciate that an inter-sheet separation distance for graphene-based films can be difficult to measure directly. Accordingly, this value may be determined indirectly through measurement of the graphene-based sheet packing density (inter-sheet separation distance (nm)=0.77/graphene-based sheet packing density)

As used herein, "graphene-based sheet packing density" or "packing density of the graphene-based sheets" is intended to mean the mass of graphene-based sheets per unit volume of a given graphene-based film. The packing density can be readily determined by knowing or determining the mass of graphene-based sheets present in a given volume of film.

Provided that the graphene-based sheets of the first graphene-based film are at least partially separated by a liquid medium, there is no particular limitation on the graphene-based sheet packing density of the film. Generally, the graphene-based sheet packing density of the first graphene-based film used in the invention will range from about 0.05 to about 1.30 g/cm$^3$.

The first graphene-based film used in accordance with the invention may comprise from about 0.1 µg/cm$^2$ to about 50 mg/cm$^2$ of graphene-based sheets, or from about 0.1 µg/cm$^2$ to about 10 mg/cm$^2$, or from about 0.1 µg/cm$^2$ to about 1 mg/cm$^2$, or from about 1 µg/cm$^2$ to about 500 µg/cm$^2$, or from about 10 µg/cm$^2$ to about 100 µg/cm$^2$, or about 45 µg/cm$^2$ of graphene-based sheets.

According to the method of the invention, the liquid medium present in the first graphene-based film is exchanged with a packing density adjustment medium. By "exchanging" the liquid medium with the packing density adjustment medium is meant that at least a portion of the liquid medium is removed from the first graphene-based film and replaced with packing density adjustment medium. The exchange may result in some or all of the liquid medium being replaced with packing density adjustment medium. For example, at least 50 vol %, or at least 60 vol %, or at least 70 vol %, or at least 80 vol %, or at least 90 vol %, or at least 95 vol %, of the liquid medium is exchanged or replaced with packing density adjustment medium. In one embodiment, substantially all of the liquid medium is exchanged with packing density adjustment medium.

For avoidance of any doubt, when a given vol % of the liquid medium is referred to as being exchanged with packing density adjustment medium, the amount of packing density adjustment medium that is exchanged will typically represent a similar or the same vol % of the liquid medium removed from the first graphene-based film.

Upon being exchanged, the packing density adjustment medium will be positioned within the first graphene-based film in a similar location to that of the correspondingly removed liquid medium. In other words, the graphene-based sheets will become at least partially separated by the packing density adjustment medium.

Upon undergoing exchange with the packing density adjustment medium, the first graphene-based film may for convenience be referred to herein as "modified" first graphene-based film.

There is no particular limitation concerning the technique used to promote exchange of the liquid medium with the packing density adjustment medium.

For example, the packing density adjustment medium may be poured, sprayed or condensed onto or over the first graphene-based film to promote the exchange. Alternatively, the liquid medium present within the first graphene-based film can be evaporated (e.g. vacuum evaporated) in the presence of the packing density adjustment medium to promote the exchange. The first graphene-based film may also be immersed in the packing density adjustment medium to promote the exchange.

The first graphene-based film will be exposed to the packing density adjustment medium for a suitable period of time to promote the degree of exchange required.

The packing density adjustment medium comprises at least two components, wherein one of the components has a volatility greater than the other component. In one embodiment, the at least two components are at least two liquid components, for example, at least two miscible liquid components.

By the volatility of one of the components being greater than the other component is meant that the more volatile component can be separated from the less volatile component through an evaporative mechanism. In other words, one of the components has a volatility greater than the other component such that the more volatile component can be separated by evaporation from the less volatile component.

As will be discussed in more detail below, removing at least some of the more volatile component from the modified first graphene-based film will cause an increase in the films graphene-based sheet packing density (with a corresponding reduction in the inter-sheet separation distance of the graphene-based sheets). With this in mind, it will be appreciated that the ratio of more volatile to less volatile components present within the packing density adjustment medium can be varied to tailor a desired reduction in the graphene-based sheet packing density.

While there is no particular limitation on the ratio of the at least two components that can be present within the packing density adjustment medium, there should nevertheless be a sufficient amount of the less volatile component present to prevent or at least minimise deformation of the modified graphene-based film upon removal of the more volatile component. Generally, the packing density adjustment medium will comprise about 0.5 vol %, 1 vol %, 2 vol %, 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, 95 vol % or 98 vol %, of the more volatile component relative to the combined volume of the less and more volatile components.

In one embodiment, the packing density adjustment medium comprises no more than about 0.5 vol %, 1 vol %, 2 vol %, 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, 95 vol % or 98 vol %, of the more volatile component relative to the combined volume of the less and more volatile components.

The at least two components used in the packing density adjustment medium will generally be miscible or soluble with each other in that they will form a solution.

Examples of the at least two components that may be used to form the packing density adjustment medium include the liquid medium components herein defined. Further examples include sulphuric acid ($H_2SO_4$), polymers such as water soluble polymer (e.g. polyvinyl alcohol (PVA)), and ionic liquids such as 1-butyl-3-methylimidazolium hexafluorophosphate, 1-hexyl-3-methylimidazolium hexafluorophosphate, 1-octyl-3-methylimidazolium hexafluorophosphate, 1-decyl-3-methylimidazolium hexafluorophosphate, 1-dodecyl-3-methylimidazolium hexafluoro phosphate, 1-ethyl-3-methyl-imidazolium-trifluorosulfonate, 1-butyl-3-methyl-imidazolium-trifluorosulfonate, 1-ethyl-3-methylimidazolium bis((trifluoromethyl) sulphonyl)-imidate, 1-hexyl-3-methylimidazolium bis((trifluoromethyl)sulphonyl)amide, 1-ethyl-3-methyl-imidazolium-trifluoroacetate, 1-butyl-3-methyl-imidazolium-trifluoroacetate, 1-ethyl-3-methyl-imidazolium-tetrafluoroborate, 1-hexylpyridinium tetrafluoroborate, 1-octylpyridinium tetrafluoroborate, 1-butyl-3-methylimidazolium tetrafluoroborate, 1-methyl-3-ethyl imidazolium chloride, 1-ethyl-3-butyl imidazolium chloride, 1-methyl-3-butyl imidazolium chloride, 1-methyl-3-butyl imidazolium bromide, 1-octyl-3-methyl-imidazolium-bromide, 1-methyl-3-propyl imidazolium chloride, 1-methyl-3-hexyl imidazolium chloride, 1-methyl-3-octyl imidazolium chloride, 1-methyl-3-decyl imidazolium chloride, 1-methyl-3-dodecyl imidazolium chloride, 1-methyl-3-hexadecyl imidazolium chloride, 1-methyl-3-octadecyl imidazolium chloride, 1-methyl-3-octadecyl imidazolium chloride, ethyl pyridinium bromide, ethyl pyridinium chloride, ethylene pyridinium dibromide, ethylene pyridinium dichloride, butyl pyridinium chloride, and benzyl pyridinium bromide.

Those skilled in the art will readily be able to select the at least two components such that one has a greater volatility than the other.

Particular examples of a suitable packing density adjustment medium include water ($H_2O$) and sulphuric acid ($H_2SO_4$), and 1-ethyl-3-methylimidazolium tetrafluoroborate ($EMIMBF_4$) and acetonitrile (AN), 1-ethyl-3-methylimidazolium tetrafluoroborate ($EMIMBF_4$) and water ($H_2O$), and water ($H_2O$), sulphuric acid ($H_2SO_4$) and polyvinyl alcohol (PVA).

Particular ratios for a $H_2O/H_2SO_4$ packing density adjustment medium might include about: 0.5 vol %, or 1 vol %, or 2.5 vol %, or 3 vol %, or 3.5 vol %, or 4 vol %, or 4.5 vol %, or 5 vol %, or 5.5 vol %, or 10 vol %, or 11 vol % or 25 vol % of $H_2SO_4$ relative to the combined volume of $H_2O$ and $H_2SO_4$ Particular ratios for a $H_2O/EMIMBF_4$ packing density adjustment medium might include 1 vol %, 2 vol %, 5 vol %, 10 vol %, 20 vol %, 50 vol % or 98 vol % of $EMIMBF_4$ relative to the combined volume of $H_2O$ and $EMIMBF_4$.

Exchange of the packing density adjustment medium with the liquid medium in the first graphene-based film will typically occur within about three hours.

After exchange with the packing density adjustment medium, the now modified first graphene-based film is subjected to a step of removing at least some of the more volatile component from the first graphene-based film. Removal of the more volatile component is typically promoted by way of evaporation. Standard techniques can be applied to promote evaporation of the more volatile component. For example, the modified first graphene-based film may be subjected to reduced pressure (i.e. pressure that is less than standard atmospheric pressure) and/or increased temperature (i.e. temperature that is higher than room temperature). Depending upon the volatility of the more volatile component, evaporation of it may be promoted simply by allowing the modified first graphene-based film to stand at room temperature and standard pressure for a suitable period of time.

Some or all of the more volatile component may be removed. In one embodiment, at least about 5 vol %, at least about 10 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol % of the total volume % of the more volatile component is removed from the modified first graphene-based film. In a further embodiment, substantially all of the more volatile component is removed from the first graphene-based film.

During and after removal of the more volatile component at least some of the less volatile component remains in the graphene-based film. Accordingly, the conditions employed to remove the more volatile component should be suitably designed so as to not also remove all of the less volatile component. The amount of less volatile component retained in the graphene-based film during removal of the more volatile component should be sufficient to minimise if not avoid undesirable deformation of the graphene-based film structure. Furthermore, upon removal of the more volatile component, a sufficient amount of the less volatile component should remain such that the graphene-based sheets are at least partially separated by at least the less volatile component.

Accordingly, removing at least some of the more volatile component from the first graphene-based film produces a graphene-based film comprising graphene-based sheets that are at least partially separated by the less volatile component.

Without wishing to be limited by theory, it is believed that the presence of the less volatile component during removal of the more volatile component keeps the graphene sheets wetted and assists with minimising or preventing deformation of the graphene-based structure. Removal of the more volatile component enables the graphene-based sheet packing density to be increased, while at the same time the retained less volatile component functions to minimise or prevent (i) deformation of the film, and (ii) restacking to the graphene-based sheets into a graphite-like structure, thereby promoting accessible surface area of the individual graphene-based sheets and facilitating the formation of a low impedance ion transport network within the film.

Accordingly, removing at least some of the more volatile component from the first graphene-based film produces a graphene-based film where the graphene-based sheets (i) have a different packing density relative to that of the first graphene-based film, and (ii) are at least partially separated by at least the less volatile component.

In one embodiment, at least about 10 vol %, at least about 20 vol %, at least about 30 vol %, at least about 40 vol %, at least about 50 vol %, at least about 60 vol %, at least about 70 vol %, at least about 80 vol %, at least about 90 vol %, of the total volume of the less volatile component exchanged remains in the resulting graphene-based film after removal of the more volatile component.

According to the method of the invention, removing at least some of the volatile component results in a graphene-based film that has a different graphene-based sheet packing density relative to that of the first graphene-based film. By the graphene-based sheet packing density being "different" is meant that the density may be greater or smaller than that presented by the first graphene-based film used in accordance with the method. The so formed graphene-based film that has a different packing density of the graphene-based sheets relative to that of the first graphene-based film may be described as a (the) second graphene-based film.

Irrespective of whether the graphene-based sheet packing density of the resulting graphene-based film is larger or smaller than that of the first graphene-based film, the method of the invention advantageously enables the so formed graphene-based film to have a tailored graphene-based sheet packing density. To date it has proven difficult to adjust the graphene-based sheet packing density of graphene-based films without encountering problems such as the deformation of the film structure. Tailoring of the final graphene-based sheet packing density can be readily achieved according to the invention simply by selecting a volume of a desired ratio of the less volatile component to more volatile component in the packing density adjustment medium for exchange followed by subsequent removal of the more volatile component from the modified first graphene-based films.

In one embodiment, removing at least some of the more volatile component from the first graphene-based film produces a graphene-based film having a larger graphene-based sheet packing density relative to that of the first graphene-based film.

In a further embodiment, the first graphene-based film has a graphene-based sheet packing density ranging from about 0.05 to about 0.1 g/cm$^3$.

In another embodiment, the inter-sheet separation distance of the graphene-based films produced in accordance with the invention ranges from about 0.5 nm to about 4 nm, or from about 0.5 nm to about 3 nm, or from about 0.5 nm to about 2 nm, or from about 0.5 nm to about 1 nm, or from about 0.5 nm to about 0.9 nm, or from about 0.5 nm to about 0.8 nm, or from about 0.5 nm to about 0.7 nm.

In a further aspect, the present invention provides a method of modifying graphene-based sheet packing density of a graphene-based film, said method comprising:
providing a first graphene-based film comprising sheets of graphene, graphene oxide, partially reduced graphene oxide, reduced graphene oxide, or a combination of two or more thereof, that are (i) arranged relative to each other in a substantially planar manner so as to form a layered structure, and (ii) at least partially separated by a liquid medium;
exchanging said liquid medium with a packing density adjustment medium that comprises at least two components, wherein one of said components has a volatility greater than the other component; and
removing at least some of the more volatile component from the first graphene-based film to produce a graphene-based film that has a modified graphene-based sheet packing density relative to that of the first graphene-based film.

Apart from having a different or modified graphene-based sheet packing density and liquid medium relative to that of the first graphene-based film, a graphene-based film produced in accordance with the method of the invention has similar structural characteristics to that of the first graphene-based film. Accordingly, the graphene-based film comprises sheets of graphene, graphene oxide, partially reduced graphene oxide, reduced graphene oxide or a combination of two or more thereof that are arranged relative to each other in a substantially planar manner so as to form a layered structure. The graphene-based sheets are also at least partially separated by at least the less volatile component, which in one embodiment is a liquid medium. Reference herein to such structural characteristics therefore equally apply to the so formed graphene-based film as they do to the first graphene-based film.

Producing graphene-based films with a desired graphene-based sheet packing density has surprisingly resulted in graphene-based films that exhibit unique and advantageous properties.

Accordingly, a further aspect the present invention provides graphene-based film comprising sheets graphene, graphene oxide, partially reduce graphene oxide, reduced graphene oxide, or a combination of two or more thereof, that are (i) arranged relative to each other in a substantially planar manner so as to form a layered structure, and (ii) separated by a liquid medium, wherein the film exhibits a packing density ($\rho$) of the graphene-based sheets ranging from 0.1-1.40 g/cm$^3$.

Features of such a graphene-based film are as herein described.

It has now been found that graphene-based films can be prepared having a relatively high graphene-based sheet packing density without the sheets being prone to collapse and restacking so as to form a graphite-like structure. For example, the graphene-based films can be prepared with a graphene-based sheet packing density approaching that of a dry graphene-based film Graphene-based films with such packing densities have been found to exhibit unique properties that may be advantageous in a variety of applications. For example, the graphene-based films may be applied in energy storage systems (ESS).

EES systems that can combine high energy density, fast charging/discharging rate and long cycle life are crucial to the success of future large-scale adoption of renewable energy and many other new emerging technologies such as portable/wearable electronics, electric vehicles, and energy regeneration system. Electrochemical capacitors (ECs) in particular have received rapidly growing interest in recent years as they are exclusively endued with the key attributes of storing energy via capacitance (fast charging capability) and long life span but can provide several orders of magnitude higher energy density than conventional capacitors. Unfortunately, the energy density of most commercially available ECs (the amount of energy stored per unit volume or weight of ECs) to date is around 5 Wh/kg, still much lower than that required by many practical applications. Introducing redox reactions at the electrode surfaces could result in increased capacitance but inevitably compromises the fast charging and long cycling capability as suppressed by sluggish kinetics of electrochemical reactions. Consequently, the widespread utilization of ECs is still limited.

ECs, also named as super- or ultracapacitors, store energy by charging electrical double layers through highly reversible ion adsorption on the surface of high-surface-area electrodes, generally made from porous carbon. The efficiency a porous carbon utilizes the given volume of an EC for energy storage can be described by its specific volumetric capacitance in a single electrode ($C_{vol}$) and energy density against the volume of two EC electrodes ($E_{vol\text{-}electrode}$). However, the volumetric energy density against the whole EC stack (including two electrodes, electrolyte, a separator between two electrodes and current collectors), $E_{vol\text{-}stack}$, may be the more reliable parameter than the gravimetric one to evaluate the real potential of a porous carbon for ECs.

$E_{vol\text{-}stack}$ relates to gravimetric capacitance of the active carbon component in a single electrode ($C_{wt\text{-}C}$), packing density of carbon ($\rho$), volume fraction of the electrodes in the device stack ($f_{electrode}$) as well as the nominal voltage (U) of the EC as follows:

$$C_{vol} = C_{wt-C} \cdot \rho \quad (1)$$

$$E_{vol-electrode} = \frac{C_{vol} \cdot U^2}{8} \quad (2)$$

$$E_{vol-stack} = E_{vol-electrode} \cdot f_{electrode} \quad (3)$$

Accordingly, a significant improvement in $E_{vol\text{-}stack}$ requires all the $C_{wt\text{-}C}$, $\rho$ and $f_{electrode}$ of electrodes be maximized. However, it appears paradoxical to increase the $\rho$ and $f_{electrode}$ (or the thickness of electrodes) without substantially compromising the $C_{wt\text{-}C}$. Taking graphene, one of promising carbon materials for high-performance ECs, as an example: graphite, a stack of graphene sheets with an inter-sheet distance of ~0.34 nm, is possibly the most compact conductive carbon materials (~2.2 g/cm³ at the ambient condition) but delivers little capacitance due to the inaccessibility of electrolyte ions to its tiny inter-sheet channels.

Even if the $\rho$ of graphene stacks is reduced by half to 1.1 g/cm³, the inter-sheet distance is only ~0.68 nm (FIG. 1). The ion diffusion and adsorption in such small-size channels are known to be very sensitive to pore size, surface wettability and particularly the pore interconnectivity. Impaired ion transport in sub-nanometer pores becomes even more pronounced when the electrodes are made thicker, further limiting $E_{vol\text{-}stack}$. The stringent requirement of achieving a high $C_{wt\text{-}C}$ yet maintaining a good ion transport network at the molecular and sub-nanometer level makes it very challenging to synthesize high-performance densely packed porous carbon. Although significant progresses have been made to achieve high $C_{wt\text{-}C}$ values of over 200 F/g through a variety of methods such as chemical activation or laser scribing of graphene, the packing density of the electrodes obtained was rather low, ranging from 0.05 to 0.5 g/cm³. As such, it still remains elusive whether and how the $E_{vol\text{-}stack}$ of ECs based on carbon materials can be improved to the level of lead-acid batteries (~30 Wh/kg or 60 Wh/L) while not compromising their indigenous power density and long lifetime.

Recent advance in graphene chemistry opens up new possibilities to address this challenge. WO 2012/006657 demonstrates that graphene-based materials can be well dispersed in water without the need for any surfactants simply by controlling its colloidal chemistry. The resulting graphene-based sheets, being microscopically corrugated, exhibit a very unique molecular assembly behaviour (they can self-gel to form an oriented graphene-based film through a simple directional-flow induced bottom-up assembly process). As a result of micro-corrugation and the repulsive inter-sheet solvation/electrostatic forces, graphene-based sheets in the hydrogel film remain largely separated, which gives rise to a high $C_{wt\text{-}C}$ of over 215.0 F/g. However, the as-formed gel films exhibit a low packing density (~0.069 g/cm³), resulting in a mediocre $C_{vol}$ and $E_{vol\text{-}electrode}$.

In contrast to porous carbon films prepared by the traditional techniques that generate fixed pore size and texture, the present invention demonstrates that certain graphene-based films, having a metastable and adaptive pore structure, can be compressed irreversibly by capillary pressure to increase the packing density through controlled removal of solvent trapped in the film. As the graphene-based sheets in the films are stacked in a nearly face-to-face fashion, the packing density can be increased up to about 1.40 g/cm³. More importantly, the resulting graphene-based films can display a continuous ion transport network, which enable the production of ECs with an exceptionally high $E_{vol\text{-}stack}$.

Figure 2:
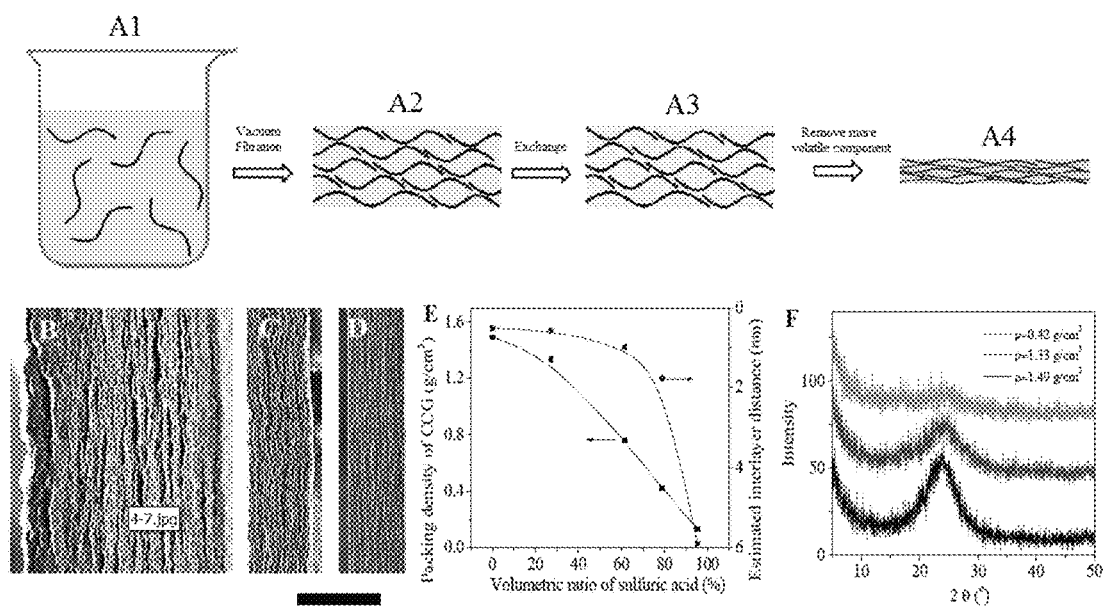
FIG. 2 illustrates a schematic representation of preparing a graphene-based film (GbF) employing the method of the invention (A). Scanning Electron Microscopy (SEM) images of GbF according to the invention with 78.9 vol % (B) and 27.2 vol % (C) of liquid medium ($H_2SO_4$), and a comparative graphene-based film (CGbF) that contains no liquid (D); Scale bar=10 μm. The relation between volume ratio of intercalated liquid medium (against the whole film) and packing density and estimated interlayer distance (E). The volume of $H_2SO_4$ can be calculated by the net mass which can be weighed and the density. It can be seen with the volume ratio of residual liquid increasing, the packing density decrease from 1.49 to 0.13 g/cm³. Xray Diffraction (XRD) patterns of the GbF (samples B-D) (F)

The method according to the present invention is schematically represented in FIG. 2A. A dispersion of graphene-based sheets (A1) may be contacted with a porous substrate and subjected to vacuum filtration (A2) to afford a graphene-based film as outlined in WO 2012/006657. This film is then subjected to exchange with a layer adjustment medium as described herein (A3). The more volatile component present within the modified first graphene-based film is then removed, for example by evaporation, to afford a graphene-based film according to the invention (A4) that has a different inter-sheet separation distance between the graphene-based sheets relative to that of the first graphene-based film.

Figure 3:
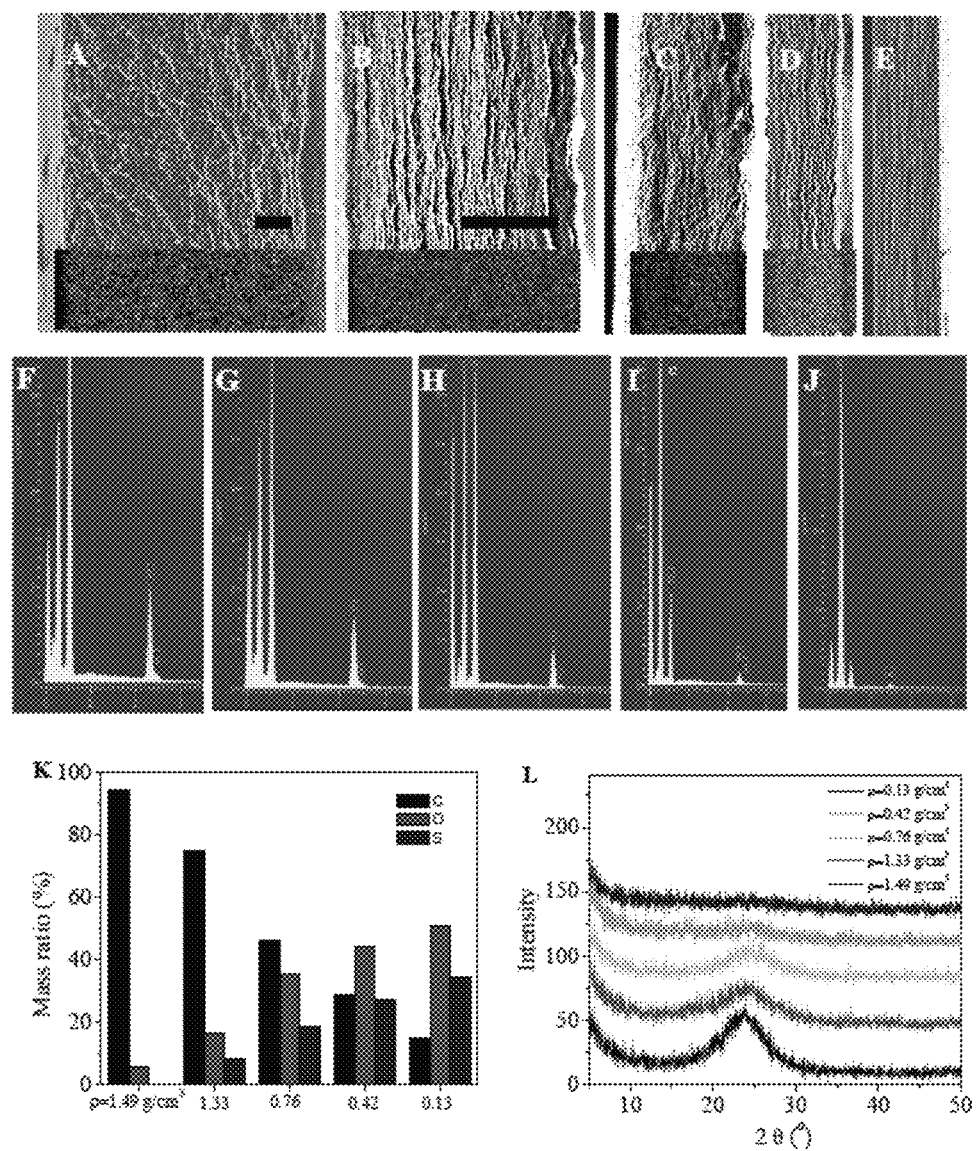
FIG. 3 illustrates (A-E) SEM images and corresponding EDS mappings of sulfur (inset) of GbF according to the invention (ρ=0.13, 0.42, 0.76 and 1.33 g/cm³) where the residual liquid is $H_2SO_4$ and CGbF (ρ=1.49 g/cm³). The scale bar stands for 10 μm and B-E share one scale bar. The corresponding EDS mappings (F-J), mass ratio (K) and XRD patterns (L) are also shown.

Scanning electron microscopy (SEM) analysis reveals that resulting graphene-based films can have a rather uniform cross-section (FIGS. 2B-D), which is also confirmed by Energy Dispersive X-ray Spectroscopy (EDS) mapping (FIGS. 3 A-E). Their thickness is nearly proportional to the ratio of less-volatile/more volatile liquids in the gel films (FIG. 2E). As all the samples in this case contained the same amount of graphene-based sheets (1.0 mg/cm² in the case of FIGS. 3 and 4) and no other additional binder/additives were used, the $\rho$ of graphene-based sheets, which is inversely proportional to the thickness of the resulting graphene-based films (FIG. 2E), can, for example, be readily controlled from about 0.13 to 1.33 g/cm³ by varying the amount of the more-volatile liquid retained in the films (FIG. 3 F-J). For comparison, an electrolyte-free and fully dried graphene-based film was prepared, whose packing density was shown to be 1.49 g/cm$^3$, lower than that of graphite crystals as a result of the micro-corrugation of the graphene-based sheets.

Advantageously, the graphene-based films according to the invention do not swell or lose their structure when immersed in a liquid.

X-ray diffraction (XRD) analysis reveals that the graphene-based films of the invention can have a nearly amorphous structure (FIG. 2F). Of the samples tested only a small and broad peak at a 2Θ of 23.5°, corresponding to d$_{002}$ spacing of 0.37 nm, is detectable when the ρ is greater than 0.76 g/cm$^3$ but it is still much smaller than that of a dried graphene-based film. This is believed to indicate that despite graphene-based sheets in the film of the invention being substantially compressed, the presence of liquid medium between the sheets can still effectively prevent their restacking to graphite. No well-defined diffraction peaks were observed at the lower region of 2Θ, further suggesting that graphene-based sheets are microscopically corrugated in the films. Otherwise, face-to-face stacking of perfectly flat sheets should have given rise to detectable XRD peaks that reflects different intersheet distances.

To investigate how the packing density might affect the capability of the graphene-based film for capacitive energy storage, a series of prototype ECs in a two symmetric electrode configuration using the graphene-based hybrid films as electrodes was fabricated. To ensure reliable comparison, all the films with varied packing densities were prepared using the same volume of graphene-based dispersions and hence contained the same amount of graphene-based sheets.

Figure 5:
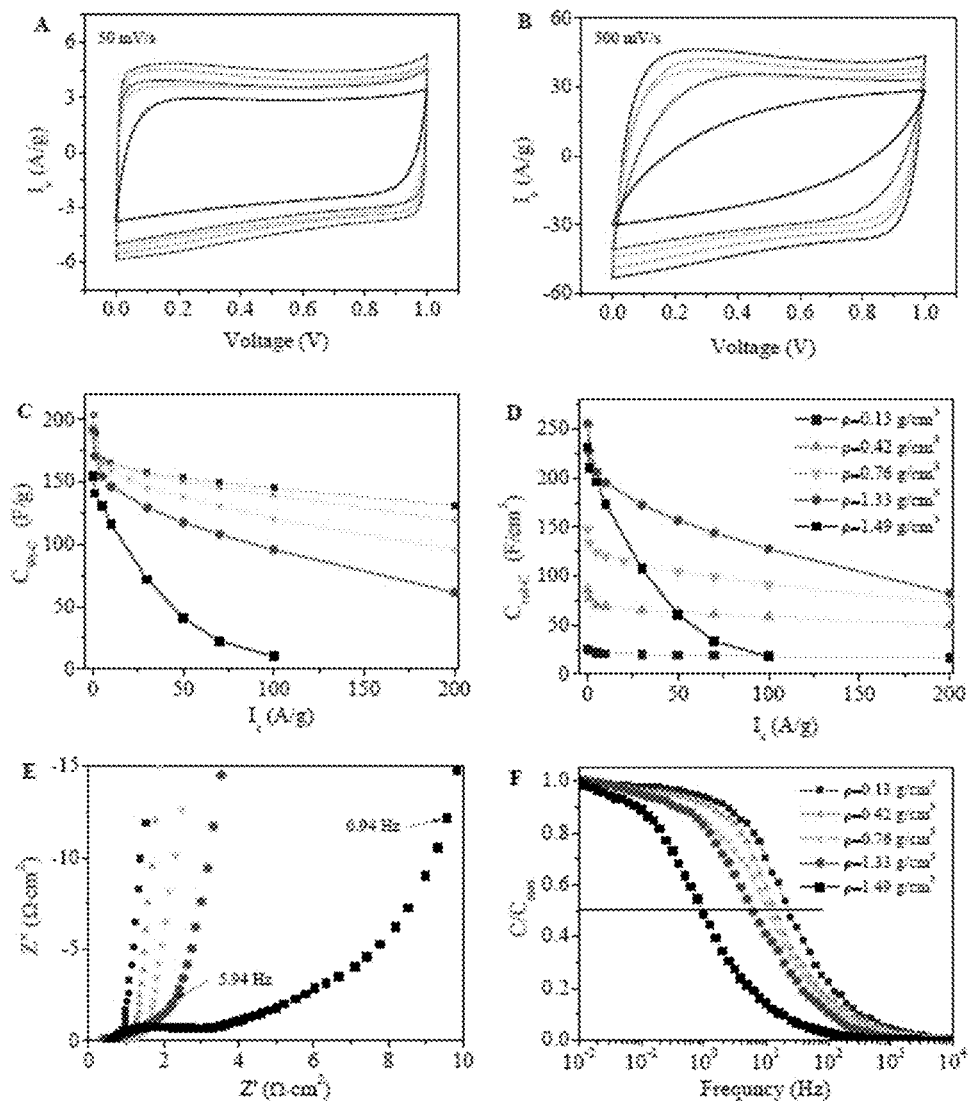
FIG. 5 illustrates the electrochemical characterization of GbF according to the invention: ρ=1.33, 0.76, 0.42 and 0.13 g/cm³, and the liquid medium here is sulfuric acid. Cyclic Voltametry (CV) curves at 50 mV/s (A) and 500 mV/s (B). Gravimetric capacitance (C) and volumetric capacitances (D) with the different current densities. Nyquist plots (E) and plots of real capacitance (F) normalized by capacitance measured at 10 mHz ($C_{max}$) versus frequency. The results for the CGbF (ρ=1.49 g/cm³) are also shown.

FIG. 5 presents typical electrochemical characterization results in 1 M H$_2$SO$_4$ electrolyte.

Figure 6:
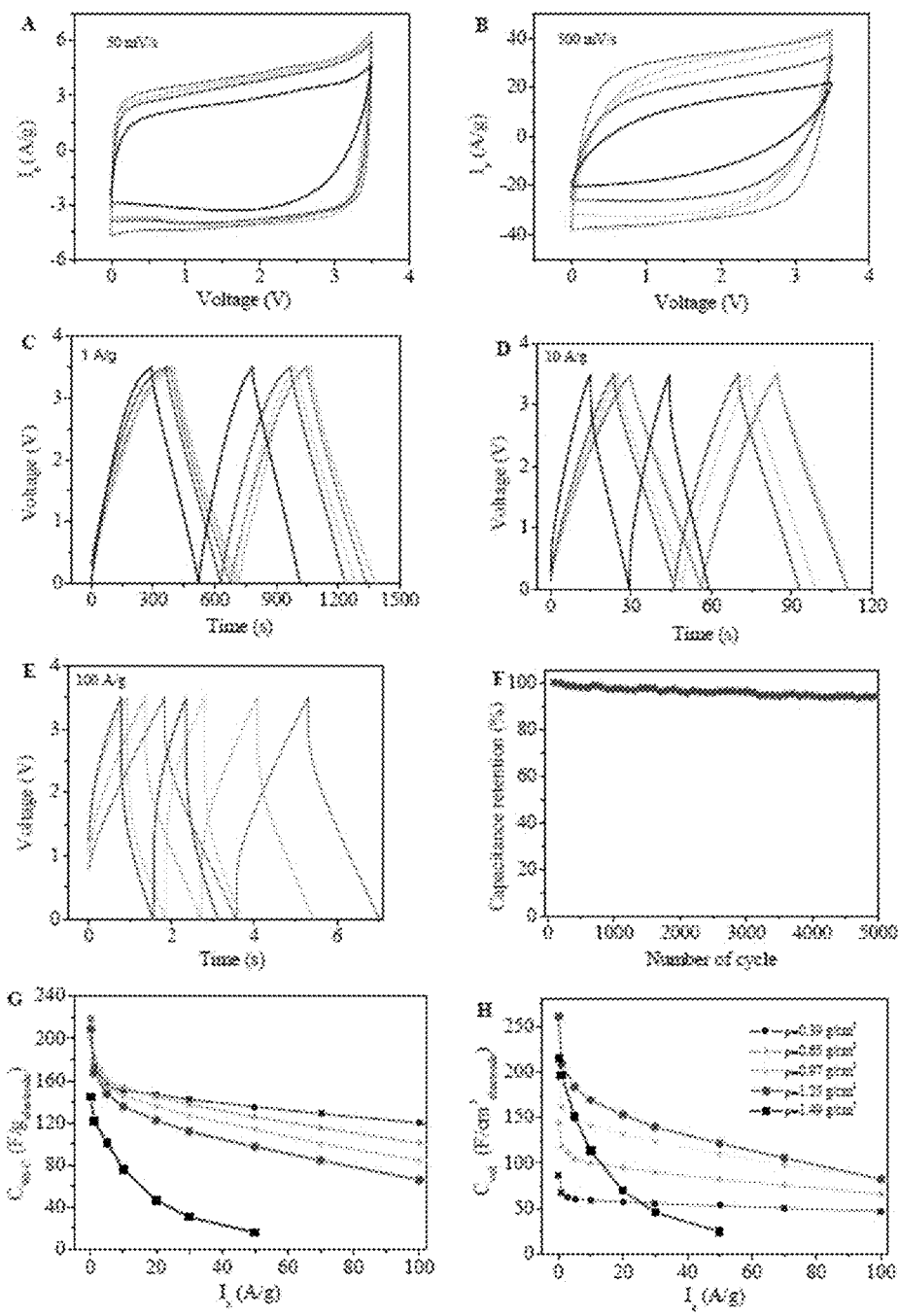
FIG. 6 illustrates electrochemical characterization of GbF according to the invention (ρ=1.25, 0.97, 0.65 and 0.39 g/cm³) and CGbF (ρ=1.49 g/cm³) in 1M $EMIMBF_4$/AN. CV curves at 50 mV/s (A) and 500 mV/s (B), (C-E) charge/discharge curves at 1, 10 and 100 A/g, (F) capacitance retention during 5000 cycles with the current density of 10 A/g of ρ=1.25 g/cm³, gravimetric capacitance (G) and volumetric capacitances (H) with the different current densities.

The cyclic voltammetry (CV) curves (FIGS. 5A and B) show nearly symmetrical rectangular shapes, indicative of an ideal capacitive behaviour for all the samples. As shown in FIG. 5C, the packing density, ρ, does affect the gravimetric capacitance of graphene-based material, $C_{wt-C}$. As expected, a lower ρ leads to a higher $C_{wt-C}$ at a given charging current density or operation rate. Nevertheless, the extent of variation is strongly dependent on whether the graphene-based film is pre-incorporated with an electrolyte during the preparation process or not. At a low operation rate of 0.1 A/g, when ρ of the films according to the invention is increased by an order of magnitude from 0.13 g/cm$^3$ to 1.33 g/cm$^3$, $C_{wt-C}$ only drops from 203.2 to 191.7 F/g. In contrast, the completely dried graphene-based paper film (1.49 g/cm$^3$) only gives a $C_{wt-C}$ of 155.2 F/g. The difference becomes even more pronounced when the films were charged faster. All the films according to the invention, regardless of ρ, can deliver a $C_{wt-C}$ over 100 F/g at an operation rate of 100 A/g whilst the $C_{wt-C}$ of the dried paper films drops to 10.2 F/g. The results obtained with an organic electrolyte (EMIMBF$_4$/AN) show a similar trend (FIG. 6G).

The influence of ρ on volumetric capacitance, $C_{vol}$, however, is very different. As shown in FIG. 5D, $C_{vol}$ of a film according to the invention is nearly proportional to ρ. Substantially increasing ρ but still retaining a high $C_{wt-C}$ using method of the invention has enabled a very high $C_{vol}$ to be achieved. The highly compacted films (1.25-1.33 g/cm$^3$) can offer a $C_{vol}$ of 255.5 F/cm$^3$ in aqueous electrolyte and 261.3 F/cm$^3$ in an organic electrolyte at the operation rate of 0.1 A/g. These values are much higher than those of activated graphene (60 F/cm$^3$) and laser-scribed graphene (12.7 F/cm$^3$).

Figure 7:
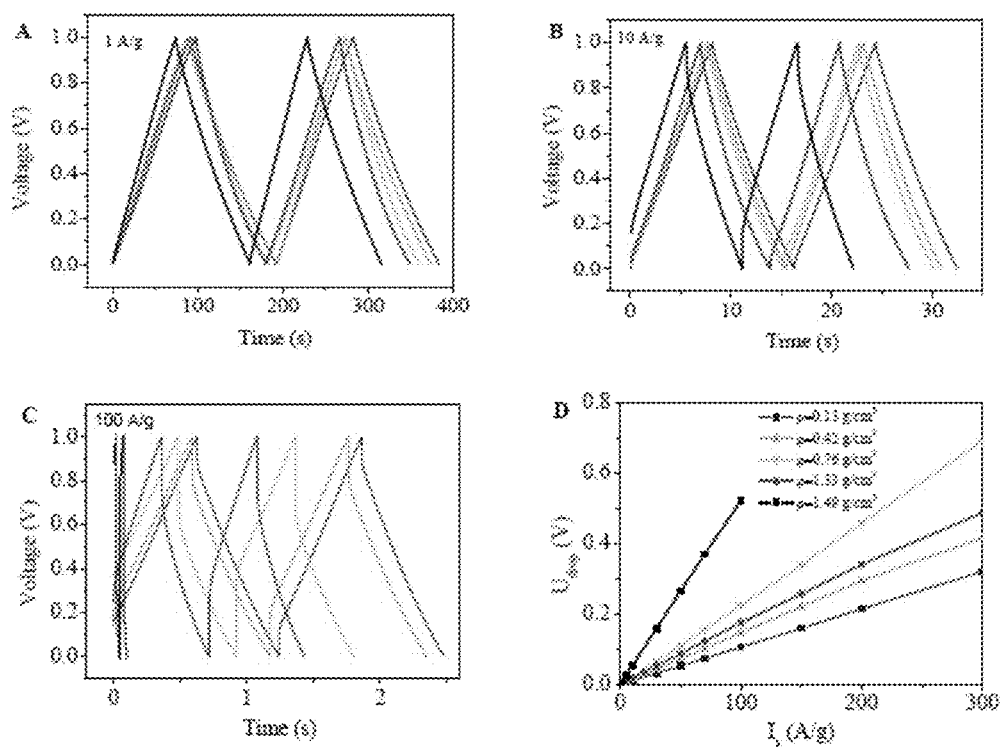
FIG. 7 illustrates charge-discharge curves (A-C) and voltage drops (D) of GbF according to the invention and CGbF at different current densities in 1.0 M $H_2SO_4$.

Particularly noteworthy is that the films according to the invention can deliver a very high $C_{vol}$ at a broad range of charge rates, which is in sharp contrast with the traditional compact porous carbon and the dried graphene-based film. The dried graphene-based film has a very high ρ and relatively good $C_{wt-C}$ at low operation rates and therefore could offer a $C_{vol}$ around 231.5 F/cm$^3$. However, this is only achievable at rather low rates (FIG. 7A) as $C_{wt-C}$ rapidly declines with the operation rate (FIG. 5C).

Such results are believed to indicate that incorporation of an electrolyte in the graphene-based films during the method of the invention not only provides a very simple way to effectively tune the packing density, but also allows the resulting films to retain an excellent rate performance, particularly when the graphene-based films become highly compact.

Electrochemical impedance spectroscopy analysis was performed to further ascertain the role of the pre-incorporated electrolyte. As shown in the Nyquist plots (FIG. 5E), the projected length of the Warburg-type line (the slope of the 45° portion of the curve) does increase with the packing density, reflecting the increased ion diffusion resistance as a result of reduced pore size due to increased packing density. However this increase is only marginal for the films of the invention but is very remarkable for the comparative dried film.

Figure 8:
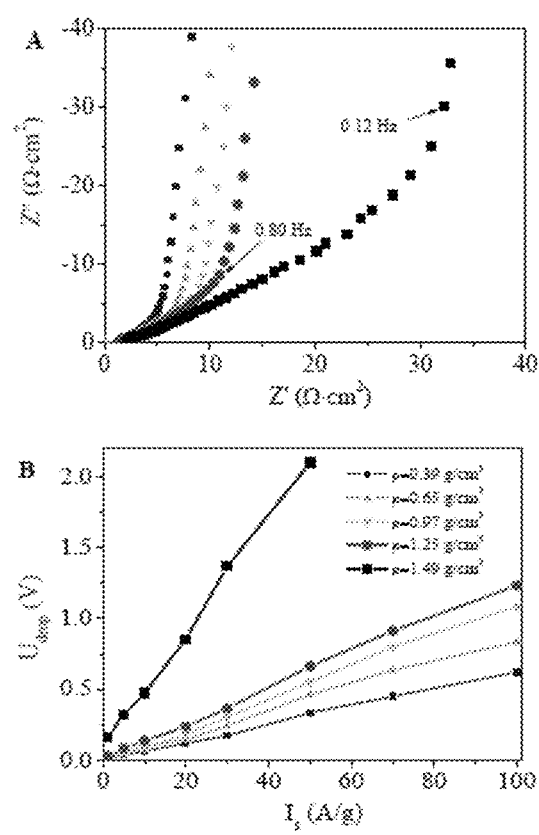
FIG. 8 illustrates Nyquist plots (A) and voltage drops (B) at different current densities of GbF according to the invention (ρ=0.39, 0.65, 0.97 and 1.25 g/cm³) and CGbF (ρ=1.49 g/cm³) in 1.0 M $EMIMBF_4$/AN.

Bode plots of the frequency response of the capacitance (FIG. 5F) also shows the same trend. Although the increase in ρ results in a longer relaxation time, $\tau_0$ (the minimum time needed to discharge all the energy from the capacitor cell with an efficiency>50%), $\tau_0$ increases from 0.043 to 0.168 when the ρ of the hybrid films increases from 0.13 to 1.33 g/cm$^3$. A ten-time increase in ρ only leads to a change in $\tau_0$ by a factor 3.88. If the sample (1.33 g/cm$^3$) is compared with the comparative dried film, the shift of $\tau_0$ is drastic, by a factor of 6.32. The frequency response of the graphene-based films according to the present invention in organic electrolyte follows a similar trend (FIG. 8A).

Figure 9:
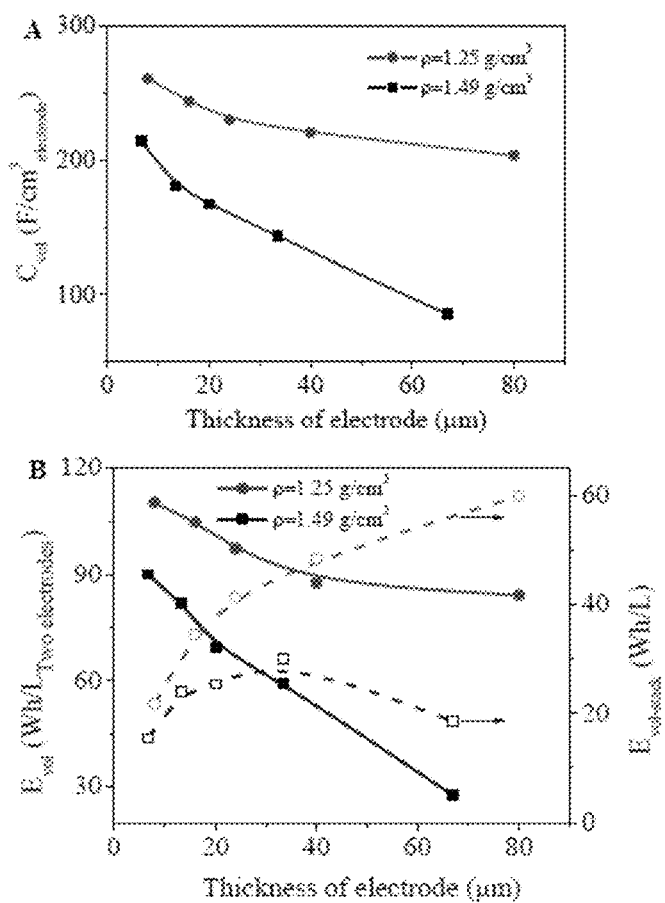
FIG. 9 illustrates volumetric capacitance (A) and energy density (B) as a function of the film thickness of GbF ($EMIMBF_4$/AN) according to the invention and CGbF. There is a large decrease of capacitance and energy density for the CGbF with the thickness over 20 μm, leading to the decrease of energy density (against the whole stack). GbF according to the invention has a limited reduction of capacitance and energy density, as a result, the energy density of the two electrodes and whole stack could increase to 110.3 and 59.9 Wh/l with the thickness of 80 μm.

FIG. 9 shows how the electrochemical performance of a graphene-based film according to the invention (ρ=1.25 g/cm$^3$) and a comparative dried film respond to thickness in an organic electrolyte. As expected, both the $C_{vol}$ and $E_{vol}$ of the two types of materials (electrodes only) decline with thickness. Nevertheless, the graphene-based film according to the invention displays a slower decline rate than the comparative dried film as a result of enhanced ion transport. When the volume of the entire EC device, including the volume of two current collectors and separator, is considered, the volumetric energy density of the whole device, $E_{vol-stack}$, shows a different trend (FIG. 9) when compared to the electrode only $E_{vol}$. As the volume ratio of the active electrodes increases with the electrode thickness, the $E_{vol-stack}$ increases for the graphene-based film of the invention when the thickness is varied from 10 to 80 μm.

Figure 10:
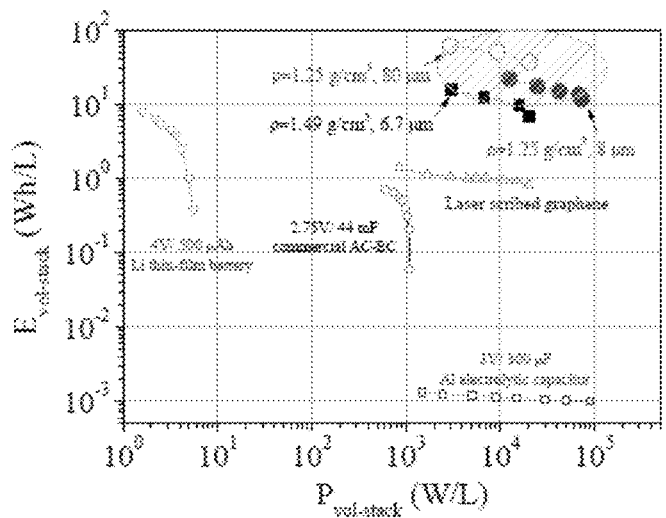
FIG. 10 illustrates Ragone plots of GbF according to the invention and CGbF, and the electrolyte here in $EMIMBF_4$/AN with the voltage of 3.5 V. The packing density and thickness of the electrodes are marked and the data of Li thin-film battery, commercial activated supercapacitor, laser scribed graphene supercapacitor and A1 electrolytic capacitor is included for comparison.
Figure 11:
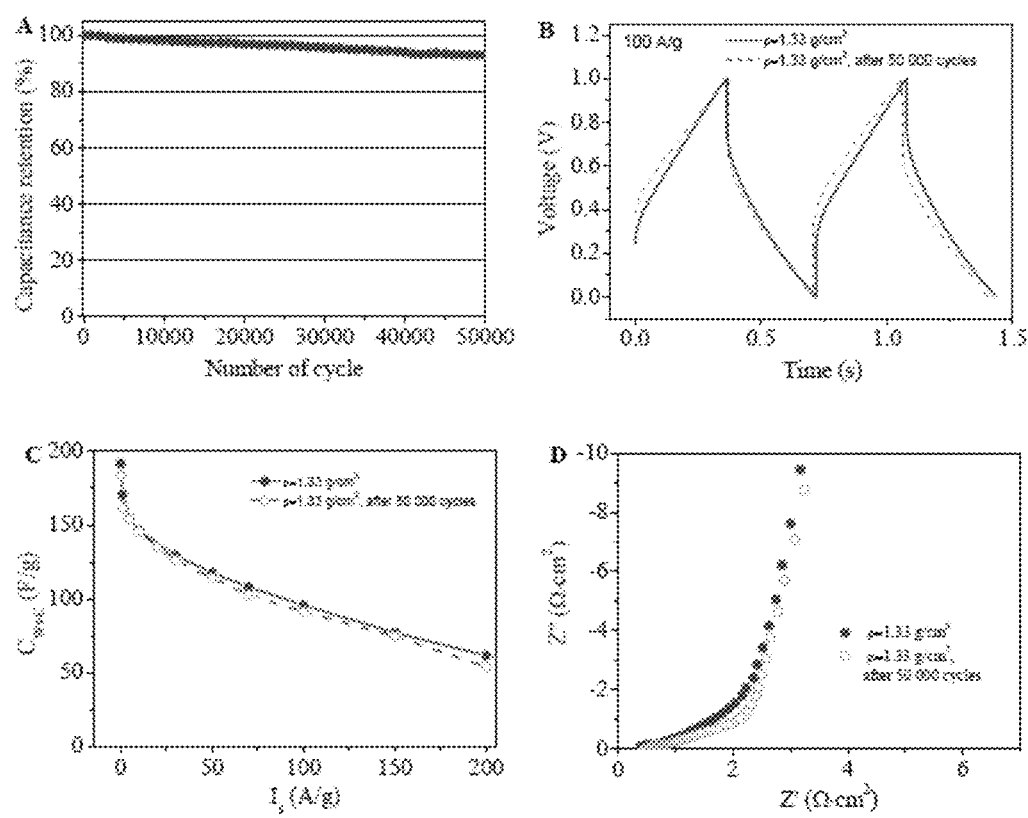
FIG. 11 illustrates cycling performance of GbF according to the invention ($\rho$=1.33 g/cm$^3$) in 1M H$_2$SO$_4$. (A) Capacitance retention, (B) charge-discharge curve at 100 A/g, (C) gravimetric capacitance and (D) Nyquist plots before and after 50,000 cycles with the current density of 100 A/g.

Whilst the compact graphene-based film based ECs (e.g. EMIMBF$_4$/AN as the electrolyte) can provide a high $E_{vol-stack}$, the ECs are still capable of delivering high volumetric power density. As shown in the Ragone plot (FIG. 10), the maximum power density, $P_{vol-stack}$, is comparable to and even higher than that of high power-density electrolytic capacitors and ECs based on laser-scribed graphene. In addition, the EC devices display excellent stability even over 50,000 cycles (FIG. 11).

According to the invention there is also provided a device comprising graphene-based film according to the invention or prepared by the method of the invention. In one embodiment, such a device is selected from a biomedical device, an electrode, a battery, a separation device, a sensor, a supercapacitor and an actuator. In a further embodiment, the electrode is superconductor.

Figure 12:
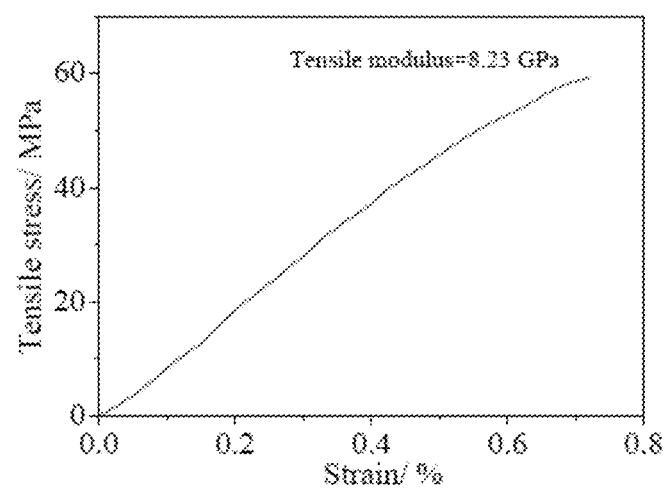
FIG. 12 illustrates typical stress-strain curves of the GbF according to the invention ($\rho$=1.25 g/cm$^3$). The electrolyte here is EMIMBF$_4$.

Liquid-mediated dense integration of the graphene-based films not only enhances the capability of capacitive energy storage drastically, it has also been found to open up numerous opportunities for further improvement in volumetric efficiency. For example, it has been found that the Young's modulus and tensile stress of the freestanding and mechanically flexible graphene-based films according to the invention ($\rho=1.25$ g/cm$^3$) can reach 8.23 GPa and 59.26 MPa (FIG. 12), respectively, comparable to that of some engineering plastics.

In corporation of polymer within the graphene-based films according to the invention can further enhance the mechanical properties of the films. Accordingly, in one embodiment the liquid medium of the first graphene-based film further comprises polymer, and/or the packing adjustment medium further comprises polymer. In another embodiment, the graphene-based film according to the invention comprises graphene-based sheets separated by a liquid medium and polymer.

The unique structural features of the graphene-based films have been found to give rise to equally unique properties. In particular, the ability to control the packing density of the graphene-based sheets has unexpectedly resulted in an ability to produce graphene-based films exhibiting a volumetric energy density approaching that of lead-acid batteries. Notably, the present invention advantageously provides for porous yet densely packed graphene-based films that can exhibit high ion-accessible surface area and low ion transport impedance. Such properties can manifest themselves in the form of unique capacitance behaviour.

For example, a graphene-based film in accordance with the invention exhibits a specific volumetric capacitance ($C_{vol}$) ranging from about 100 F/cm$^3$ to about 300 F/cm$^3$, or from about 150 F/cm$^3$ to about 270 F/cm$^3$, at an operation rate of 0.1 A/g and using 1.0 M H$_2$SO$_4$ as electrolyte.

In one embodiment, a graphene-based film in accordance with the invention exhibits a $C_{vol}$ of at least 100 F/cm$^3$, or at least 150 F/cm$^3$, or at least 180 F/cm$^3$, or at least 200 F/cm$^3$, or at least 210 F/cm$^3$, or at least 220 F/cm$^3$, or at least 230 F/cm$^3$, or at least 240 F/cm$^3$, or at least 250 F/cm$^3$, or at least 260 F/cm$^3$ at an operation rate of 0.1 A/g and using 1.0 M H$_2$SO$_4$ as electrolyte.

In a further embodiment, a graphene-based film in accordance with the invention exhibits a $C_{vol}$ ranging from about 50 F/cm$^3$ to about 180 F/cm$^3$, or from about 75 F/cm$^3$ to about 175 F/cm$^3$, or from about 85 F/cm$^3$ to about 175 F/cm$^3$, at an operation rate of 50 A/g and using 1.0 M H$_2$SO$_4$ as electrolyte.

In another embodiment, a graphene-based film in accordance with the invention exhibits a $C_{vol}$ of at least 50 F/cm$^3$, or at least 75 F/cm$^3$, or at least 85 F/cm$^3$, or at least 100 F/cm$^3$, or at least 125 F/cm$^3$, or at least 135 F/cm$^3$, or at least 145 F/cm$^3$, or at least 150 F/cm$^3$, at an operation rate of 50 A/g and using 1.0 M H$_2$SO$_4$ as electrolyte.

In a further embodiment, a graphene-based film in accordance with the invention exhibits a specific gravimetric capacitance ($C_{wt-c}$) ranging from about 100 F/g to about 225 F/g, or from about 150 F/g to about 200 F/g, at an operation rate of 0.1 A/g and using 1.0 M H$_2$SO$_4$ as electrolyte.

In another embodiment, a graphene-based film in accordance with the invention exhibits a $C_{wt-c}$ of at least 100 F/g, or at least 150 F/g, or at least 160 F/g, or at least 170 F/g, or at least 180 F/g, or at least 190 F/g, or at least 195 F/g, or at least 200 F/g, or at least 205 F/g, or at least 210 F/g at an operation rate of 0.1 A/g and using 1.0 M H$_2$SO$_4$ as electrolyte.

In a further embodiment, a graphene-based film in accordance with the invention exhibits a $C_{wt-c}$ ranging from about 50 F/g to about 180 F/g, or from about 75 F/g to about 175 F/g, at an operation rate of 50 A/g and using 1.0 M H$_2$SO$_4$ as electrolyte.

In a another embodiment, a graphene-based film in accordance with the invention exhibits a $C_{wt-c}$ of at least 50 F/g, or at least 75 F/g, or at least 85 F/g, or at least 100 F/g, or at least 125 F/g, or at least 135 F/g, or at least 145 F/g, or at least 150 F/g, at an operation rate of 50 A/g and using 1.0 M H$_2$SO$_4$ as electrolyte.

In a further embodiment, a graphene-based film comprising 1.0 mg/cm$^2$ of graphene-based material in accordance with the invention exhibits a relaxation time ($\tau_0$) of less than 1.06, or 1.0, or 0.90, or 0.80, or 0.70, or 0.60, or 0.50, or 0.40, or 0.30, or 0.20, or 0.18, or 0.16, or 0.14, or 0.12 seconds, where $\tau_0$ is the minimum time needed to discharge all energy from the capacitor cell with an efficiency of at least 50%.

In another embodiment, a graphene-based film comprising 1.0 mg/cm$^2$ of graphene-based material in accordance with the invention exhibits a $\tau_0$ ranging from about 1.06 to about 0.12 seconds, or from about 0.5 to about 0.12 seconds.

The present invention therefore also provides a supercapacitor comprising at least one graphene-based film (a) according to the invention, or (b) prepared by the method of the invention, as an electrode.

The properties of supercapacitors according to the invention are believed to be unique in their own right.

The present invention therefore also provides a supercapacitor having a $C_{vol}$ of at least 100, or at least 150, or at least 180, or at least 200, or at least 210, or at least 220, or at least 230, or at least 240, or at least 250, or at least 260 F/cm$^3$ at an operation rate of 0.1 A/g and using 1.0 M H$_2$SO$_4$ as electrolyte, and/or a $C_{vol}$ ranging from about 50 F/cm$^3$ to about 180 F/cm$^3$, or from about 75 F/cm$^3$ to about 175 F/cm$^3$, or from about 85 F/cm$^3$ to about 175 F/cm$^3$, at an operation rate of 50 A/g and using 1.0 M H$_2$SO$_4$ as electrolyte.

The present invention further provides a supercapacitor having a $C_{wt-c}$ of at least 100, or at least 150, or at least 160, or at least 170, or at least 180, or at least 190, or at least 195, or at least 200, or at least 205, or at least 210 F/g at an operation rate of 0.1 A/g and using 1.0 M H$_2$SO$_4$ as electrolyte, and/or a $C_{wt-c}$ ranging from about 50 F/g to about 180 F/g, or from about 75 F/g to about 175 F/g, at an operation rate of 50 A/g and using 1.0 M H$_2$SO$_4$ as electrolyte.

The present invention further provides a supercapacitor having a $C_{vol}$ of at least 100, or at least 150, or at least 180, or at least 200, or at least 210, or at least 220, or at least 230, or at least 240, or at least 250, or at least 260 F/cm$^3$ at an operation rate of 0.1 A/g and using 1.0 M H$_2$SO$_4$ as electrolyte, and/or a $C_{vol}$ ranging from about 50 F/cm$^3$ to about 180 F/cm$^3$, or from about 75 F/cm$^3$ to about 175 F/cm$^3$, or from about 85 F/cm$^3$ to about 175 F/cm$^3$, at an operation rate of 50 A/g and using 1.0 M H$_2$SO$_4$ as electrolyte, and/or a $C_{wt-c}$ of at least 100, or at least 150, or at least 160, or at least 170, or at least 180, or at least 190, or at least 195, or at least 200, or at least 205, or at least 210 F/g at an operation rate of 0.1 A/g and using 1.0 M H$_2$SO$_4$ as electrolyte, and/or a $C_{wt-c}$ ranging from about 50 F/g to about 180 F/g, or from about 75 F/g to about 175 F/g, at an operation rate of 50 A/g and using 1.0 M H$_2$SO$_4$ as electrolyte.

Those skilled in the art will appreciate that $C_{vol}$ refers to the specific volumetric capacitance normalised against the volume of graphene-based material in a single electrode when tested in a symmetric two-electrode supercapacitor.

Those skilled in the art will also appreciate that $C_{wt-c}$ refers to the specific gravimetric capacitance normalised against the mass of graphene-based material in a single electrode when tested in a symmetric two-electrode supercapacitor. Equation (1) defined herein defines the relationship between $C_{vol}$ and $C_{wt-c}$.

EXAMPLES

Materials, Methods and Results (a) Preparation of Chemically Converted Graphene Dispersion Graphene oxide (GO) was synthesized from graphite (SP-1, Bay Carbon) using the modified Hummers method as originally presented by Kovtyukhova and colleagues. The graphite powder (5 g) was place in an 80° C. solution of concentrated $H_2SO_4$ (7.5 ml), $K_2S_2O_8$ (2.5 g) and $P_2O_5$ (2.5 g). The resultant dark blue mixture was cooled to room temperature over a period time of 6 h, then carefully diluted with distilled water, filtered, and washed until the pH of the filtrate was close to 7 (Milli-Q® water was used in all experiments). The peroxidized product was dried in 50° C. oven overnight, and placed into cold (0° C.) concentrated $H_2SO_4$ (115 ml). $KMnO_4$ (15 g) was added gradually under stirring and the temperature of the mixture was kept below 20° C. The mixture was then stirred at 35° C. for 2 h. 230 ml of water was added into the mixture, after 15 min more water (700 ml) and 30% $H_2O_2$ (12.5 ml) were added to terminate the reaction. The mixture was then washed with 1:10 HCl solution (1.1 L). Afterwards the sample was subjected to 5 min of centrifugation at 3000 r.p.m. The sediment was collected, dispersed in water and centrifuged. This process was repeated 2-3 times, until no sediment was found. The graphite oxide dispersion was then subjected to dialysis to completely remove metal ions and acids. Graphene oxide was obtained by further sonication of graphite oxide in water. In a typical procedure for chemical conversion of graphite oxide to graphene, the resulting homogeneous dispersion (5.0 ml) was mixed with 5.0 ml of water, 5.0 ml of hydrazine solution (35 wt % in water) and 35.0 ml of ammonia solution (28 wt % in water) in a 20-ml glass vial. The weight ratio of hydrazine to GO was about 7:10. After being vigorously shaken or stirred for a few minutes, the vial was put in a water bath (100° C.) for 3 h (b) Preparation of Graphene-Based Film As shown in the FIG. 2A, the GbF were fabricated as follows: (1) 25 ml of the chemically converted graphene oxide (CCG, 0.4 mg/ml) dispersions were filtered through a mixed cellulose ester filter membrane (0.05 µm pore size) by vacuum suction to obtain first graphene-based gel films. The amount of CCG in all GbF was controlled to be 1.0 mg/cm²; (2) the first graphene gel films were soaked in adjust liquid medium with varied concentrations overnight to exchange the trapped water; (3) the films were then placed in a vacuum oven (10 Pa) for 12 h to vaporize the water in the gel film. The removal of water in the gel films resulted in shrinkage of the film in thickness. Consequently, the packing density of CCG was increased, which was directly mediated by the ratio of water/electrolyte exchanged in the hydrogel films.

Two liquid mediums were used in this work, sulfuric acid ($H_2SO_4$) and ionic liquid (1-ethyl-3-methylimidazolium tetrafluoroborate, $EMIMBF_4$). The aqueous $H_2SO_4$ solutions with 0.556 vol %, 2.78 vol %, 5.56 vol % or 27.8 vol % of $H_2SO_4$ were used to produce GbF, leading to a packing density of 1.33, 0.76, 0.42 or 0.13 g/cm³, respectively. Accordingly, we used their packing density to differentiate the samples: $\rho=1.33$ g/cm³, $\rho=0.72$ g/cm³, $\rho=0.42$ g/cm³ or $\rho=0.13$ g/cm³.

$EMIMBF_4$ aqueous solutions with 1 vol %, 2 vol %, 5 vol % or 10 vol % of $EMIMBF_4$ were used to produce GbF, with a resultant packing density of 1.25, 0.97, 0.65, 0.39 or 0.069 g/cm³, respectively. These samples were marked as $\rho=1.25$ g/cm³, $\rho=0.97$ g/cm³, $\rho=0.65$ g/cm³, $\rho=0.39$ g/cm³ or $\rho=0.069$ g/cm³, respectively. The temperature for obtaining $CCG/H_2SO_4$ or $CCG/EMIMBF_4$ hybrid films in Step 3 was 25 and 50° C., respectively.

As a control, the dried CGbF film was fabricated via vacuum vaporizing the water inside the graphene gel film without adding any liquid medium trapped.

The weight of the films was pre-estimated by the actual area of the films. The weight was then checked again after testing (after removing the electrolytes by washing by deionized water and then drying). If there was any inconsistency (usually smaller than 1.5%), the value obtained by direct weighing of the tested sample was used.

(c) Application of Prepared GbF

Figure 4:
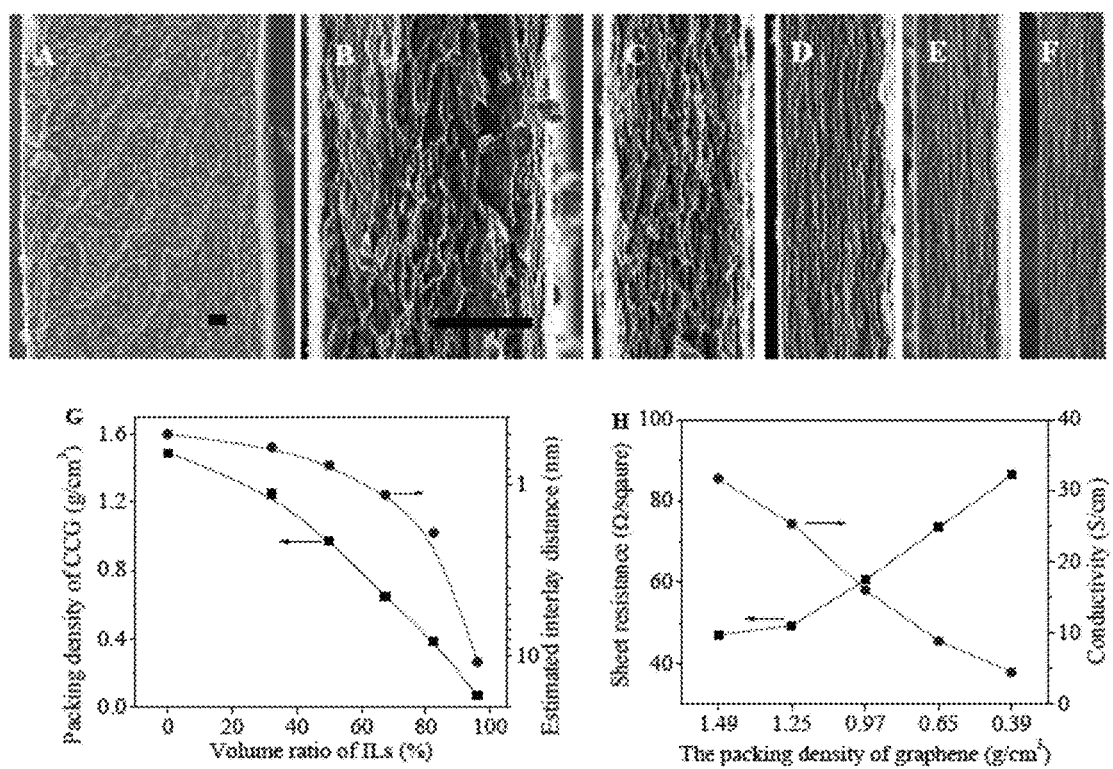
FIG. 4 illustrates SEM images of GbF according to the invention (ρ=0.069, 0.39, 0.65, 0.97 and 1.25 g/cm³) (A-E) where the residual liquid is 1-ethyl-3-methylimidazolium tetraflouroboratye ($EMIMBF_4$) and CGbF (ρ=1.49 g/cm³) (F). The scale bar stands for 10 μm and B-E share one scale bar. (G) The relation between volume ratio of intercalated residual liquid (against the whole film) and packing density and estimated interlayer distance. The volume of residual liquid can be calculated by the net mass of residual liquid which can be weighed and the density of residual liquid. It can be seen with the volume ratio of residual liquid increasing, the packing density decrease from 1.49 to 0.069 g/cm³. (H). Sheet resistance/conductivity of the samples are also shown.

The GbF and CGbF films were directly used as electrodes without adding any other polymeric binders or conductive additives. The sizes of all the films were the same (1.0 cm×1.0 cm) and their thicknesses were measured by SEM (FIGS. 3 and 4). Unless specifically stated in the figure captions, the mass density of CCG in the electrodes of both CCG/electrolyte and dried CCG films was 1.0 mg/cm². To study the effect of the electrode thickness, a certain number of films containing 1.0 mg/cm² of CCG with the same area were stacked in a face-to-face manner and then pressed together to obtain the electrodes with the thickness needed.

Prototype ECs were assembled in a symmetrical two-electrode configuration using a similar procedure reported in the literature. The films were soaked in the electrolyte solution for 3 h prior to the device assembly and then pressed on two Pt foils. At the end of Pt foils, platinum wires were clipped onto the foils by toothless alligator clips, which were then connected to a VMP2/Z multi-channel potentiostat/galvanostat for electrochemical characterization. A glassy fiber filter paper was sandwiched between two CCG/electrolyte or dried CCG films and then infiltrated with electrolyte solutions, 1.0 M $H_2SO_4$ or 1.0 M $EMIMBF_4$/AN. Finally, the devices were wrapped by parafilm. The assembly of ECs with the electrolyte of $EMIMBF_4$/AN was done in a glove box under a nitrogen filled atmosphere.

Cyclic voltammetry (CV) tests were carried out at different scan rates from 5 to 500 mV/s. The galvanostatic charge-discharge tests were carried out at different current densities from 0.1 to 300 A/g. The operating voltages for the electrolytes of 1.0 M $H_2SO_4$ aqueous solution and 1.0 M $EMIMBF_4$/AN were 1.0 and 3.5 V, respectively. Electrochemical impedance spectroscopy measurements were performed with a sinusoidal signal with a magnitude of 10 mV over a frequency ranging from 100 kHz to 10 mHz.

The dense GbF (1.25-1.33 g/cm³) can offer a $C_{vol}$ of 255.5 F/cm³ in aqueous electrolyte (FIG. 5D) and 261.3 F/cm³ in organic electrolyte (FIG. 10E) at the operation rate of 0.1 A/g. These values are much higher than those of chemically activated graphene (60.0 F/cm³) or laser-scribed graphene (12.7 F/cm³). Particularly noteworthy is that the dense GbF can deliver a very high $C_{vol}$ at a broad range of charging rates from 0.1 (0.133 A/cm³) to 200.0 A/g (266.0 A/cm³). To our knowledge, no other porous carbon can provide such exceptional volumetric performance. Note that even though the dried CCG film can deliver a $C_{vol}$ of around 231.5 F/cm³ at 0.1 A/g, the value falls off rapidly with the increase of operation rate (FIG. 5C) as a result of a quickly declining $C_{wt-C}$.

FIG. 9 shows how the electrochemical performance of GbF ($\rho$=1.25 g/cm$^3$) and the CGbF ($\rho$=1.49 g/cm$^3$) response to thickness change in the organic electrolyte. As with other porous carbon, both the $C_{vol}$ and $E_{vol\text{-}electrode}$ of the two types of materials decline with thickness. Nevertheless, the GbF displays a much slower decline rate than the dried film, reflecting superior ion transport. When the effect of thickness on $E_{vol\text{-}stack}$ is considered, the volume fraction of the active electrodes ($f_{electrode}$) needs to be taken into account (see Equation 3). Because the $f_{electrode}$ increases with the electrode thickness when the other components of ECs remain unchanged whilst the reduction in $E_{vol\text{-}electrode}$ with thickness is not significant in the case of the GbF, the hybrid film displays an overall increase in $E_{vol\text{-}stack}$ with thickness (see the red dash line in FIG. 9B). The EC device based on two GbFs of 80 μm (containing 10 mg/cm$^2$ of CCG, which is comparable to the amount of carbon contained in many commercial EC devices) gives an $E_{vol\text{-}stack}$ of 59.9 Wh/L, 44 times higher than laser-scribed graphene-based ECs and 6 times higher than lithium thin-film batteries (FIG. 10). Note that this value is very close to that of lead-acid battery. By contrast, the $E_{vol\text{-}stack}$ of the dried CCG film increases with thickness initially and then starts to drop at the thickness of 33.5 μm due to substantial drop in $E_{vol\text{-}electrode}$ (see the black dash line in FIG. 9B). The $E_{vol\text{-}stack}$ using 10 mg/cm$^2$ of the dried CCG film as electrodes is only ~18.4 Wh/L, further highlighting the crucial role of low ion transport resistance for achieving a high $E_{vol\text{-}stack}$.

(d) the Preparation and Application of GbF in Polymeric Insertion

The first graphene-based gel films were also soaked in adjust polymeric liquid medium at 85° C. to keep the low viscosity of polymeric solution for 12 hours. The adjust polymeric liquid medium here is polyvinyl alcohol (PVA) aqueous solution and the liquid medium including 8.33 vol % and 2.08 vol % of PVA relative to the combined volume of H$_2$O and PVA. The films then placed in a vacuum oven for 12 h to vaporize the water in the gel film and PVA would get gelation inside the gel films due to their interfacial interaction at room temperature. The GbFs with the packing density of 0.48 g/cm$^3$ and 0.32 g/cm$^3$ could be obtained, respectively.

The H$_2$SO$_4$-PVA gel electrolyte was simply made as follows: in a typical process, 0.05 g H$_2$SO$_4$ was mixed with 0.5 ml deionized water and then 0.05 g PVA powder was added. The whole mixture was heating up steadily to ~85° C. under vigorous stirring until the solution became clear. Then the solution was then poured on the GbFs and the films with a thin solution layer coating on was left at room temperature for 12 h to vaporize the excess water. For GbF based supercapacitors, two pieces of GbF films were pressed together under a pressure of 10 MPa for 10 min by a sheeting presser. Two pieces of Pt foils or Pt wires were used as the current collectors, which were then connected to a Versastat-4 or VMP2/Z multi-channel potentiostat/galvanostat (Princeton Applied Research) for electrochemical characterization.

Figure 13:
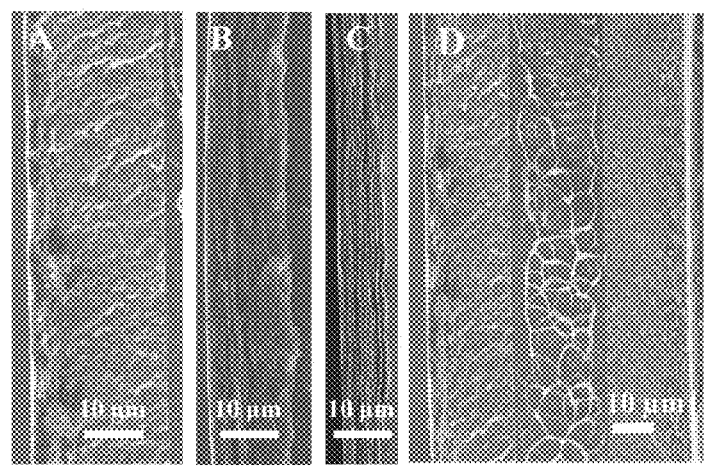
FIG. 13 illustrates SEM images of GbF according to the invention ($\rho$=0.48 and 0.91 g/cm$^3$) (A-B) and CGbF ($\rho$=1.49 g/cm$^3$) (C). The SEM image of prototype solid-state supercapacitor with PVA-H$_2$SO$_4$ gel electrolyte sandwiched by two GbFs (D)

It is difficult to distinguish polymeric medium from graphene layers by SEM images, since the morphology of layering becomes more indistinct with the polymer increasing (FIG. 13), compared to that of the CGbF (FIG. 13c). The overall uniform structure of its cross-section across the GbF indicates that the intercalation of polymer is even (FIGS. 13a and b).

Figure 14:
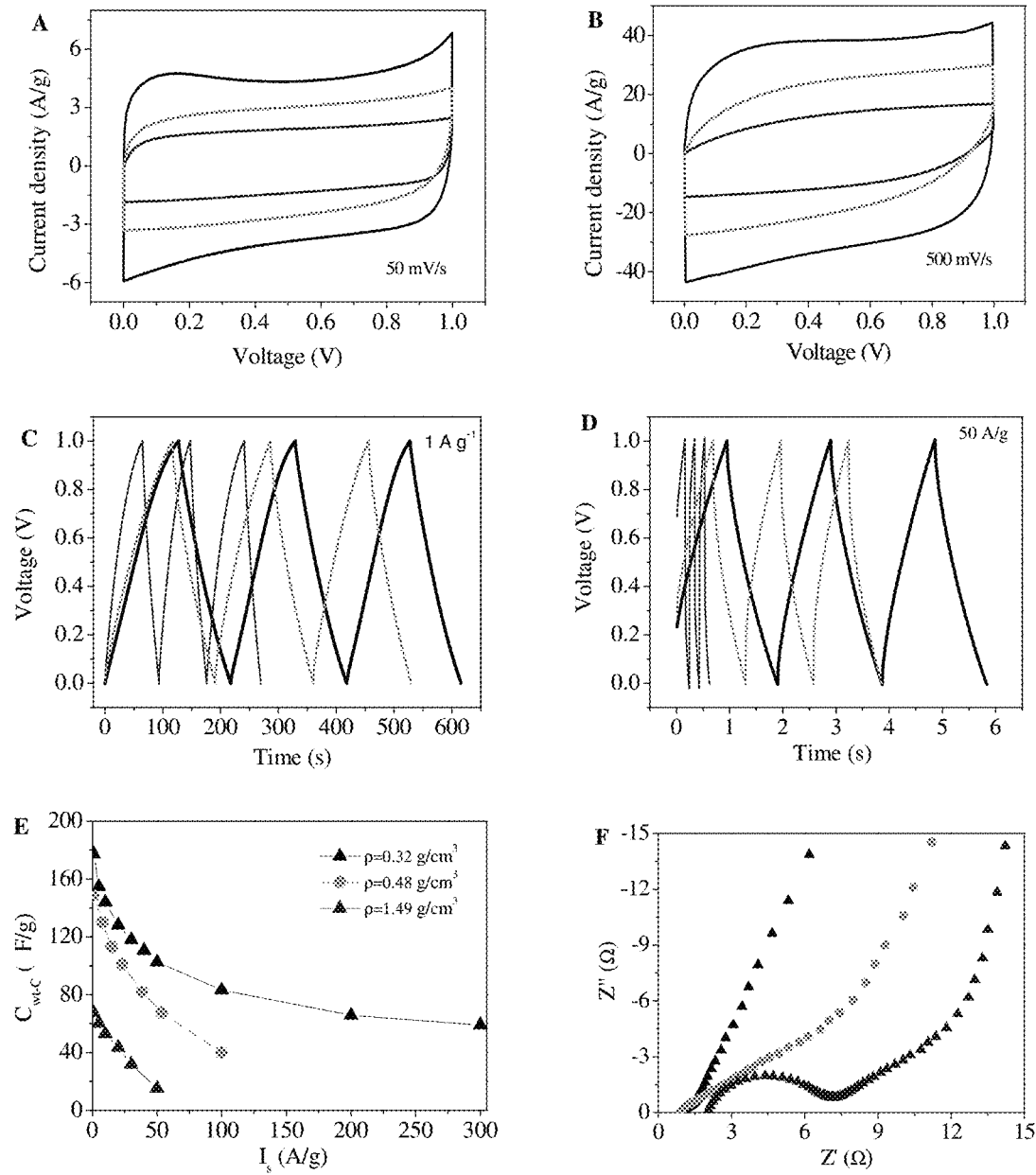
FIG. 14 illustrates electrochemical characterization of GbF according to the invention ($\rho$=0.48 and 0.32 g/cm$^3$) and CGbF ($\rho$=1.49 g/cm$^3$) in PVA-H$_2$SO$_4$. CV curves at 50 mV/s (A) and 500 mV/s (B), (C-D) charge/discharge curves at 1 and 50 A/g, (E) gravimetric capacitance and (F) Nyquist plots.

The GbFs with the PVA inside could be used as the electrodes of solid-state supercapacitor with H$_2$SO$_4$—PVA as the separator and electrolyte (FIG. 13D). As-prepared supercapacitors based on GbF ($\rho$=0.32 g/cm$^3$) show more rectangular loops at both low and high CV scan rates than CGbF (FIG. 14a-b), while its specific capacitances are 177.3, 144.0 and 83.0 F/g at 1, 10 and 100 A/g, respectively, while the capacitances of CGbF are 67.3, 52.9 and below 5 F/g (FIG. 14E). For further exploring the effects of pore structures on the electrochemical performance, we prepared the GbF with smaller inter-sheet separation distances by intercalating fewer polymers, which shows the specific capacitances of 148.4, 121.3 and 40 F/g at 1, 10 and 100 A/g, respectively (FIG. 14E). These disparate performances show that the electrode material with a larger inter-sheet separation distance has a larger electrochemically active surface area and faster ionic transport, since ions can fast diffuse onto the surface of the highly porous graphene films. The differences of ion transport in the solid-state supercapacitors are further confirmed with the electrochemical impedance (FIG. 14F). The projected length of the Warburg-type line on the real axis characterizes the ion diffusion process, and the resultant internal resistance of the GbF is only about one-tenth that of CGbF (FIG. 14F).

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. Graphene-based film comprising sheets of graphene, graphene oxide, partially reduced graphene oxide, reduced graphene oxide, or a combination of two or more thereof, that are (i) arranged relative to each other in a substantially planar manner so as to form a layered structure, and (ii) separated by a liquid medium comprising one or more of polymer, sulfuric acid, and an ionic liquid, wherein the film exhibits (i) a packing density ($\rho$) of the graphene-based sheets ranging from 1-1.40 g/cm$^3$ and (ii) a gravimetric capacitance over 100 F/g at an operational rate of 100 A/g.

2. The graphene-based film according to claim 1 having a specific volumetric capacitance ($C_{vol}$) of at least 100 F/cm$^3$ at an operation rate of 0.1 A/g and using 1.0 M H$_2$SO$_4$ as electrolyte, or a specific volumetric capacitance ($C_{vol}$) of at least 50 F/cm$^3$ at an operation rate of 50 A/g and using 1.0 M H$_2$SO$_4$ as electrolyte.

3. The graphene-based film according claim 1 having a relaxation time ($\tau_0$) of less than 1 second when measured from a capacitor cell based on 1.0 mg/cm$^2$ of the so formed graphene-based film, where to is the minimum time needed to discharge all energy from the capacitor cell with an efficiency of at least 50%.

4. A device comprising at least one graphene-based film according to claim 1.

5. A supercapacitor comprising at least one graphene-based film according to claim 1, as an electrode.

6. The graphene-based film according claim 1 wherein the sheets are arranged so as to form a layered structure where at least about 60% of the graphene-based sheets within the film are aligned along their major axis at less than about 45°.

* * * * *